US009754329B2

(12) United States Patent
Lin et al.

(10) Patent No.: US 9,754,329 B2
(45) Date of Patent: Sep. 5, 2017

(54) MANAGEMENT SYSTEM, SMART METER, SERVER, OPERATION METHOD AND MANAGEMENT METHOD

(71) Applicant: Industrial Technology Research Institute, Hsinchu (TW)

(72) Inventors: Chung-Wei Lin, Changhua County (TW); Lun-Chia Kuo, Taichung (TW); Wan-Jung Lin, New Taipei (TW); Nien-Chen Lin, Taichung (TW)

(73) Assignee: Industrial Technology Research Institute, Hsinchu (TW)

( * ) Notice: Subject to any disclaimer, the term of this patent is extended or adjusted under 35 U.S.C. 154(b) by 1055 days.

(21) Appl. No.: 13/898,485

(22) Filed: May 21, 2013

(65) Prior Publication Data
US 2014/0214729 A1 Jul. 31, 2014

(30) Foreign Application Priority Data
Jan. 29, 2013 (TW) .............................. 102103353 A

(51) Int. Cl.
G06Q 50/06 (2012.01)
H04L 29/06 (2006.01)
(Continued)

(52) U.S. Cl.
CPC ............. *G06Q 50/06* (2013.01); *G06Q 10/06* (2013.01); *H04L 69/04* (2013.01); *G01D 4/002* (2013.01); *Y04S 10/54* (2013.01)

(58) Field of Classification Search
CPC .......... G01D 4/00; G01R 11/00; G01R 21/00; Y02B 70/00; Y02B 60/00; Y02B 90/02; H04L 69/04
See application file for complete search history.

(56) References Cited

U.S. PATENT DOCUMENTS 7,071,852 B1 * 7/2006 Wegener ............ G01R 13/0272
341/144
8,156,055 B2 4/2012 Shimada et al.
(Continued)

FOREIGN PATENT DOCUMENTS

CN 202512170 10/2012
TW 200611472 4/2006
(Continued)

OTHER PUBLICATIONS

Jin Cheng and Thomas Kunz, A survey on Smart Home Networking, Sep. 2009, Carleton University, System and Computer Engineering, Technical Report SCE-09-10.*

(Continued)

*Primary Examiner* — Daniel Vetter
*Assistant Examiner* — Scott Tungate
(74) *Attorney, Agent, or Firm* — Jianq Chyun IP Office

(57) ABSTRACT

A management system, a smart meter, a server, an operation method and a management method are provided. The management system includes a remote server and at least one smart meter. The smart meter is coupled to the remote server via a communication network. The smart meter measures electrical energy of at least one power line to obtain at least one batch of electricity data. The smart meter detects whether the loading event occurs. If the loading event occurs, the smart meter performs data compression on the electricity data obtained during an event period corresponding to the loading event to obtain compressed data, and uploads the compressed data to the remote server. The remote server performs data decompression on the compressed data to obtain decompressed data. The remote server performs load identification according to the decompressed data.

35 Claims, 14 Drawing Sheets

(51) Int. Cl.
*G06Q 10/06* (2012.01)
*G01D 4/00* (2006.01)

(56) References Cited

U.S. PATENT DOCUMENTS

| | | | | |
|---|---|---|---|---|
| 2006/0067268 | A1* | 3/2006 | Lee .................... | H04L 1/0002 370/328 |
| 2009/0274294 | A1* | 11/2009 | Itani .................... | H03M 7/30 380/28 |
| 2010/0115013 | A1 | 5/2010 | Abbaspour et al. | |
| 2010/0131243 | A1* | 5/2010 | Park .................... | G01R 19/2513 702/198 |
| 2011/0112779 | A1 | 5/2011 | Tse et al. | |
| 2011/0295912 | A1* | 12/2011 | Sanchez Loureda .. | G01D 3/032 707/812 |
| 2012/0004871 | A1* | 1/2012 | Tsao .................... | G01D 4/00 702/61 |
| 2012/0109398 | A1* | 5/2012 | Bhakta .................... | H02J 3/14 700/295 |

FOREIGN PATENT DOCUMENTS

| | | |
|---|---|---|
| TW | I270282 | 1/2007 |
| TW | I341923 | 5/2011 |
| TW | 201145745 | 12/2011 |
| TW | 201206114 | 2/2012 |
| TW | I359601 | 3/2012 |
| TW | 201242203 | 10/2012 |

OTHER PUBLICATIONS

Chi-Jui Wu, et al., "Data Compression Applied to Electric Power Quality Tracking of Arc Furnace Load", Journal of Marine Science and Technology, vol. 11, No. 1, 2003, pp. 39-47.

Hahnsang Kim, et al., "MODELZ: Monitoring, Detection, and Analysis of Energy-Greedy Anomalies in Mobile Handsets", IEEE, Transactions on Mobile Computing, vol. 10, No. 7, Jul. 2011, pp. 968-981.

You-Wei Liu, et al., "Compressed Recording Technique for Power System Transient Voltage Waveform", Power System Technology, vol. 33, No. 7, Apr 2009, pp. 1-4.

Zi-Min Lin, "The Study of the Spline Interpolation for Compression of the Continuous Arterial Blood Pressure", Feng Chia University, Department of Automatic Control and Systems Engineering, Jun. 2010, pp. 1-36.

Jin-Mu Huang, "New ECG signal compression method based on integer wavelet transform and vector quantization", International Conference on Advanced Information Technologies (AIT), 2008, pp. 1-11.

Hsiao-Hsuan Chou, "Time-Domain and Transform-Domain Compression Algorithms for ECG Signals with Irregular Periods", National Taiwan University, Dissertation of Electrical Engineering Department, Jun. 2006, pp. 1-58.

Tsu-Hsun Fu, et al., "Data Compression of Voltage Flicker and Harmonic Waveforms Using Discrete Wavelet Transform", Thesis of the 23rd Electrical Engineering Conference in R.O.C., 2002, pp. 1300-1304.

"Office Action of Taiwan Counterpart Application", issued on Jul. 11, 2014, p. 1-p. 12.

\* cited by examiner

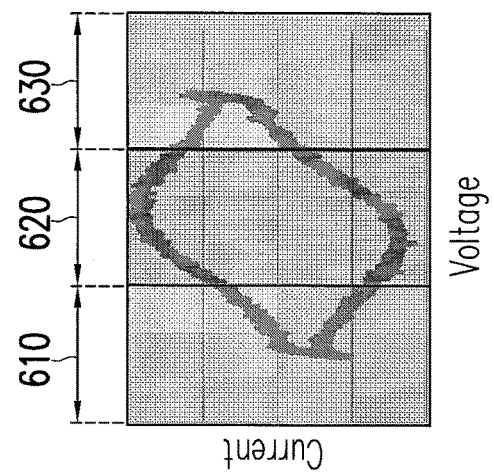
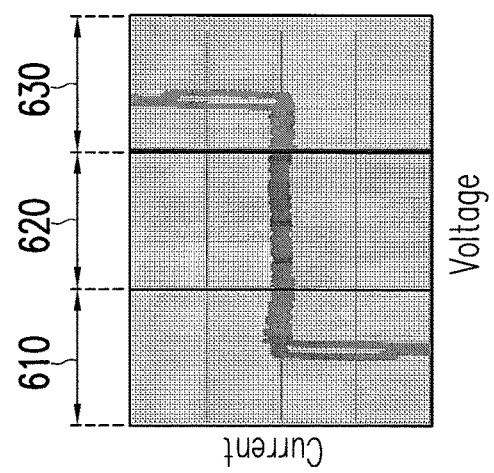
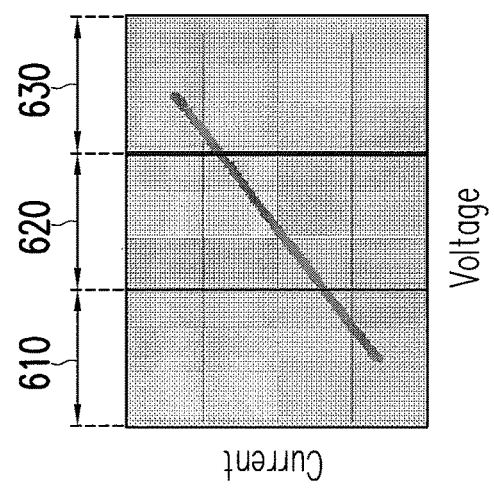
FIG. 6C
FIG. 6B
FIG. 6A

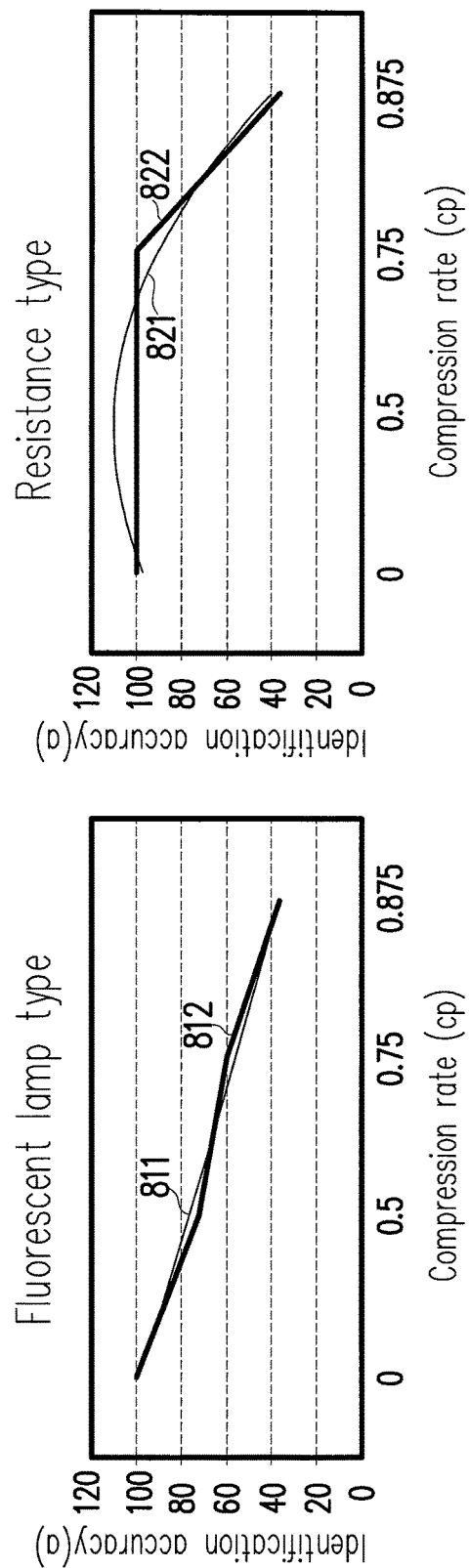

FIG. 9A

| Type code (4) | Real power (16) | Virtual power (16) | Harmonic (16) | Other power characteristics (16) | ... | Other power characteristics (16) | Start code (4) | Index code (8) | Sampling value (16) | ... | Sampling value (16) |

Current waveform data spans the Sampling value fields.

FIG. 9B

| Type code (4) | Start code (4) | Index code (8) | Sampling value (16) | ... | Sampling value (16) |

Current waveform data spans the Sampling value fields.

| Type code (4) | Real power (16) | Virtual power (16) | Harmonic (16) | Other power characteristics (16) | ... | Other power characteristics (16) |

MANAGEMENT SYSTEM, SMART METER, SERVER, OPERATION METHOD AND MANAGEMENT METHOD

CROSS-REFERENCE TO RELATED APPLICATION

This application claims the priority benefit of Taiwan application serial no. 102103353, filed on Jan. 29, 2013. The entirety of the above-mentioned patent application is hereby incorporated by reference herein and made a part of this specification.

TECHNICAL FIELD

The disclosure relates to a management system, a smart meter, a remote server and operation methods of the smart meter and the remote server, and management method of an electrical appliance power characteristic database.

BACKGROUND

Besides measuring electricity consumption of home appliances, a smart meter can also monitor load conditions (turning on/off) of the home appliances through a non-invasive manner. In the application of monitoring the load conditions of the home appliances through the non-invasive manner, a computing capability of the general smart meter is inadequate, which can perform identification on real power information, so that the identification accuracy is not high. Another method is to first determine event occurrence through the smart meter, and then power characteristics thereof are uploaded to cloud, so as to perform the load identification at the cloud. In order to accurately obtain a load condition of the electrical appliance, resolution of the smart meter has to be enhanced, though the amount of generated data of the power characteristics is increased. For example, when a sampling rate is 4 KHz, a flow of data uploaded to the cloud by the smart meter is 7.5 KB/s. In view of a system operator, the huge data amount of the power characteristics may increase a bandwidth cost of the cloud, a storage space leasing cost and a calculation cost.

SUMMARY

An embodiment of the disclosure provides a management system of smart meter, which includes a remote server and at least one smart meter. The smart meter is coupled to the remote server through a communication network. The smart meter measures electrical energy of at least one power line to obtain at least one batch of electricity data. The smart meter detects whether a loading event occurs. If the loading event occurs, the smart meter performs data compression on the electricity data obtained during an event period corresponding to the loading event to obtain compressed data, and uploads the compressed data to the remote server. The remote server performs data decompression on the compressed data to obtain decompressed data. The remote server performs load identification according to the decompressed data.

An embodiment of the disclosure provides an operation method of a smart meter, which includes following steps. Electrical energy of at least one power line is measured to obtain at least one batch of electricity data. It is detected whether a loading event occurs. If the loading event occurs, data compression is performed on the electricity data obtained during an event period corresponding to the loading event to obtain compressed data, and the compressed data is uploaded to a remote server.

An embodiment of the disclosure provides a smart meter including a power measuring unit, a communication unit and a processing unit. The power measuring unit measures electrical energy of at least one power line to obtain at least one batch of electricity data. The processing unit is coupled to the power measuring unit and the communication unit. The processing unit detects whether a loading event occurs. If the loading event occurs, the processing unit performs data compression on the electricity data obtained during an event period corresponding to the loading event to obtain compressed data. The processing unit uploads the compressed data to the remote server through the communication unit.

An embodiment of the disclosure provides an operation method of a remote server, where the remote server manages at least one smart meter through a communication network. The operation method includes following steps. Compressed data uploaded by the smart meter is received. Data decompression is performed on the compressed data to obtain decompressed data. Load identification is performed according to the decompressed data.

An embodiment of the disclosure provides a remote server to manage at least one smart meter through a communication network. The remote server includes a communication unit and a processing unit. The processing unit is coupled to the communication unit. The processing unit receives compressed data uploaded by the smart meter through the communication unit. The processing unit performs data decompression on the compressed data to obtain decompressed data. The processing unit performs load identification according to the decompressed data.

An embodiment of the disclosure provides an operation method of a remote server, where the remote server manages at least one smart meter through a communication network. The operation method includes following steps. Electricity data uploaded by the smart meter is received, where the electricity data includes a plurality of power characteristics. Load identification is performed on a plurality of electrical appliance samples in an electrical appliance power characteristic database according to the power characteristics. An electrical appliance corresponding to the electricity data is determined according to a result of the load identification.

An embodiment of the disclosure provides a remote server, which manages at least one smart meter through a communication network. The remote server includes an electrical appliance power characteristic database, a communication unit and a processing unit. The processing unit is coupled to the electrical appliance power characteristic database and the communication unit. The processing unit receives electricity data uploaded by the smart meter through the communication unit, where the electricity data includes a plurality of power characteristics. The processing unit performs load identification on a plurality of electrical appliance samples in the electrical appliance power characteristic database according to the power characteristics. The processing unit determines an electrical appliance corresponding to the electricity data according to a result of the load identification.

An embodiment of the disclosure provides a management method for an electrical appliance power characteristic database, which includes following steps. A provider provides at least one electrical appliance sample, and uploads the electrical appliance sample to the electrical appliance power characteristic database, where the electrical appliance sample has a plurality of sample characteristics. A smart meter uploads a plurality of power characteristics to a remote server. The remote server performs load identification on content of the electrical appliance power characteristic database according to the power characteristics. When a result of the load identification indicates that the electrical appliance sample is adopted, the remote server automatically accumulates adopted times of the electrical appliance sample.

According to the above descriptions, an embodiment of the disclosure provides a management system, a smart meter and a remote server thereof, and operation methods of the smart meter and the remote server. In some embodiments, the system can dynamically adjust a compression rate of the electricity data (for example, current waveform data) according to power characteristics of different types of the electrical appliances, and upload the compressed data to the remote server. In some other embodiments, the system may allocate different power characteristic weightings according to different power characteristics (for example, real power, virtual power, current waveform, harmonics, transients or other power characteristics), so as to improve the identification accuracy. In some other embodiments, the system may consider the load identification accuracy and charging mechanisms of different remote server platforms (for example, a cloud server) to dynamically adjust the compression rate. The disclosure further provides a management method of the electrical appliance power characteristic database to establish a mechanism that a provider (for example, an electrical appliance manufacturer, a service provider, a general user or other persons) provides the electrical appliance samples to the system.

In order to make the aforementioned and other features of the disclosure comprehensible, several exemplary embodiments accompanied with figures are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIG. 6A, FIG. 6B and FIG. 6C are schematic diagrams of voltage-current curves of different load types according to an embodiment of the disclosure.

FIG. 8A and FIG. 8B are schematic diagrams of different compression rate-identification accuracy models corresponding to different electrical appliance types according to an embodiment of the disclosure.

FIG. 9A is a schematic diagram illustrating a data structure of a packet according to an embodiment of the disclosure.

FIG. 9B is a schematic diagram illustrating a data structure of a packet according to another embodiment of the disclosure.

DETAILED DESCRIPTION OF DISCLOSED EMBODIMENTS

Figure 1:
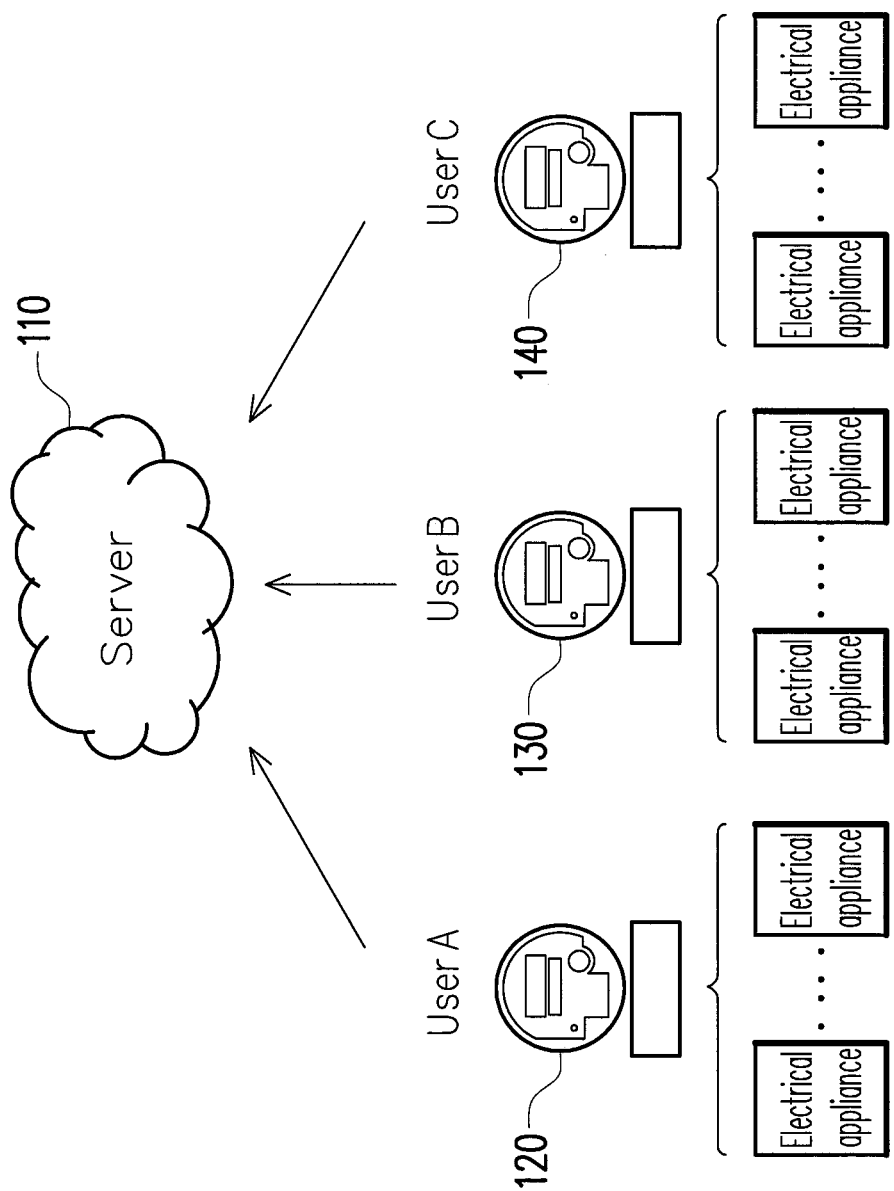
FIG. 1 is a schematic diagram of an application example of a management system of a smart meter according to an embodiment of the disclosure.

A term "couple" used in the full text of the disclosure (including the claims) refers to any direct and indirect connections. For example, if a first device is described to be coupled to a second device, it is interpreted as that the first device is directly coupled to the second device, or the first device is indirectly coupled to the second device through other devices or connection means. Moreover, wherever possible, components/members/steps using the same referential numbers in the drawings and description refer to the same or like parts. Components/members/steps using the same referential numbers or using the same terms in different embodiments may cross-refer related descriptions.

FIG. 1 is a schematic diagram of an application example of a management system of a smart meter according to an embodiment of the disclosure. The management system includes a remote server 110 and at least one smart meter (for example, smart meters 120, 130 and 140 shown in FIG. 1). The remote server 110 can be any type of a calculation platform, for example, a cloud server, a large-scale computer, a personal computer or other electronic devices. The remote server 110 can be set and managed by a system operator to provide an non-invasive home appliance load identification/monitoring service.

In the application example of FIG. 1, the smart meters 120, 130 and 140 are respectively installed in houses of different users (or companies and factories). The smart meters 120, 130 and 140 are respectively connected to one or a plurality of electrical appliances (loads). The smart meter can measure electrical energy of at least one power line to obtain electricity data of the power line. The power line can transmit electricity to one or a plurality of electrical appliances (loads).

The smart meters 120, 130 and 140 are respectively coupled to the remote server 110 through a communication network. The communication network can be any type of a communication mechanism, for example, Internet, a local area network (LAN), a wireless local area network (WLAN), a telephone system, a third generation (3G) mobile communication protocol or other communication network. The smart meters 120, 130 and 140 can respectively upload the electricity data to the remote server 110. In some embodiments, the smart meter 120, 130 or 140 can upload the uncompressed electricity data to the remote server 110. In some other embodiments, the smart meter 120, 130 or 140 can first compress the electricity data, and then upload the compressed electricity data to the remote server 110 (which is described later).

In the present embodiment, the smart meters 120, 130 and 140 respectively detect whether a "loading event" occurs. For example, the smart meter 120 can detect whether an electrical appliance in the corresponding electricity network is turned on/off or switched to other operation mode. The other smart meters 130 and 140 can be deduced according to related description of the smart meter 120. Once any of the electrical appliances (load) in the electricity network has a turn on event, a turn off event or is switched to other operation mode, the smart meter 120 can learn occurrence of these events by detecting power characteristics (for example, a real power, a virtual power, a current waveform, harmonic, transient or other power characteristics) of the power network (power line). In the present embodiment, theses events are referred to as "loading events".

When the loading event occurs, the smart meter 120 uploads the electricity data obtained during an "event period" corresponding to the loading event to the remote server 110. The so-called "event period" can be defined according to a design requirement of an actual product/system. For example, in some embodiments, a time range of 10 seconds before and after a time point corresponding to the loading event is defined as the event period. In some other embodiments, a time range of 2 seconds before and after a time point corresponding to the loading event is defined as the event period.

Figure 2:
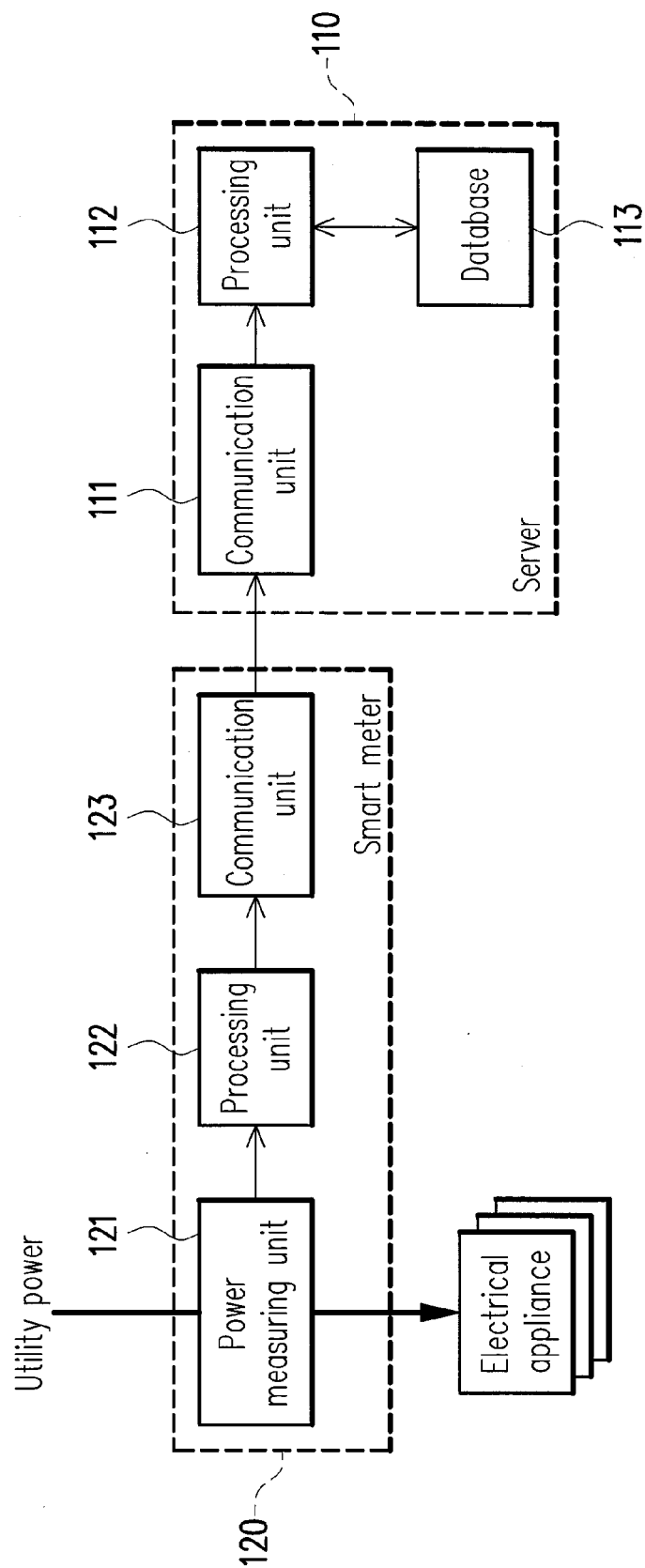
FIG. 2 is a functional block schematic diagram of a smart meter and a remote server according to an embodiment of the disclosure.

FIG. 2 is a functional block schematic diagram of a smart meter and a remote server according to an embodiment of the disclosure. The embodiment of FIG. 2 can refer to related description of FIG. 1. The smart meter 120 includes a power measuring unit 121, a processing unit 122 and a communication unit 123. Utility power supplies electricity to one or a plurality of electrical appliances (loads) through at least one power line, as that shown in FIG. 2. The power measuring unit 121 may measure electrical energy (for example, a voltage and/or a current) of the power line to obtain at least one batch of electricity data.

The processing unit 122 is coupled to the power measuring unit 121 and the communication unit 123. The processing unit 122 detects whether a "loading event" occurs according to the power characteristic measured by the power measuring unit 121 (referring to related description of FIG. 1). In some embodiments, when the loading event occurs, the processing unit 122 uploads compressed electricity data obtained during the "event period" corresponding to the loading event to the remote server 110. In some other embodiments, when the loading event occurs, the processing unit 122 performs data compression on the electricity data obtained during the "event period" to obtained compressed data. After the data compression is completed, the processing unit 122 uploads the compressed data to the remote server 110 through the communication unit 123. According to different design requirements of different embodiments, the electricity data or the compressed data may include a real power value, a virtual power value, a harmonic value, current waveform data, voltage waveform data and/or other electrical characteristic data.

The remote server 110 may manage one or a plurality of smart meters (for example, the smart meter 120) through a communication network. The remote server 110 includes a communication unit 111, a processing unit 112 and an electrical appliance power characteristic database 113. The processing unit 112 is coupled to the communication unit 111 and the electrical appliance power characteristic database 113. In some embodiments, if the smart meter 120 uploads the uncompressed electricity data to the remote server 110, the processing unit 112 receives the electricity data (including a plurality of power characteristics) uploaded by the smart meter 120 through the communication unit 111. The processing unit 112 performs load identification on a plurality of electrical appliance samples in the electrical appliance power characteristic database 113 according to the power characteristics. According to a result of the load identification, the processing unit 112 determines an electrical appliance corresponding to the electricity data. In some other embodiments, if the smart meter 120 uploads the compressed electricity data to the remote server 110, the processing unit 112 receives the compressed data uploaded by the smart meter 120 through the communication unit 111. The processing unit 112 performs data decompression on the compressed data to obtain decompressed data. The processing unit 112 performs load identification according to the decompressed data.

Figure 3:
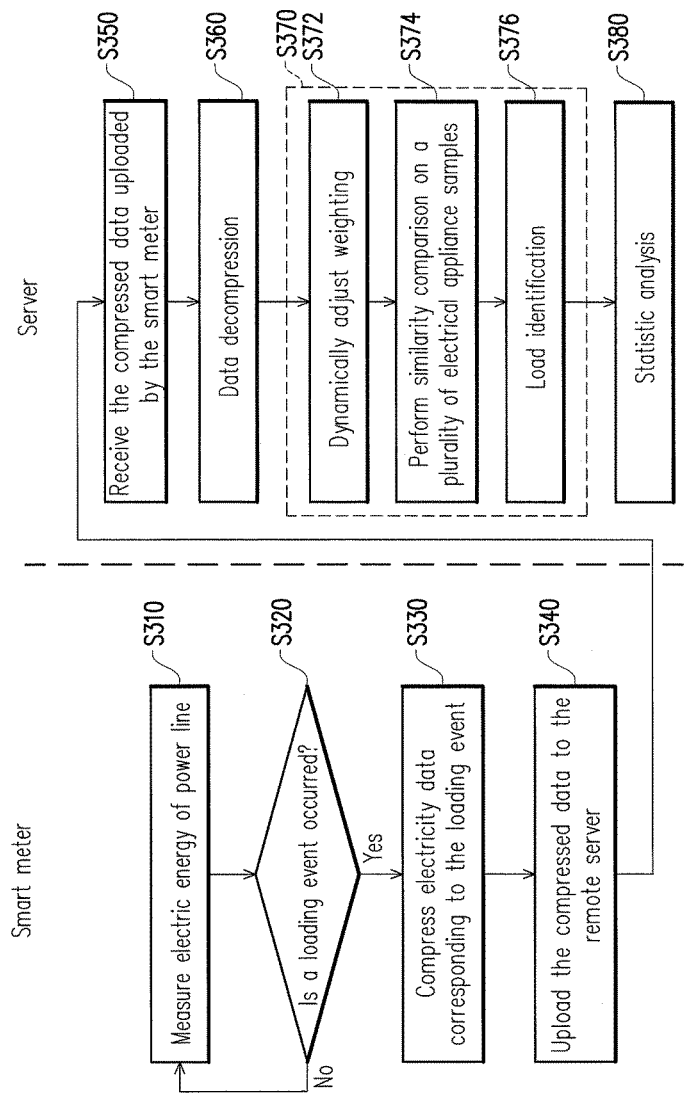
FIG. 3 is a flowchart illustrating operation methods of a smart meter and a remote server according to an embodiment of the disclosure.

FIG. 3 is a flowchart illustrating operation methods of a smart meter and a remote server according to an embodiment of the disclosure. The embodiment of FIG. 3 can be deduced according to related descriptions of FIG. 1 and FIG. 2. Referring to FIG. 2 and FIG. 3, the power measuring unit 121 executes a step S310 to measure electrical energy of the power line to obtain the electricity data. The processing unit 122 executes a step S320 to detect whether the loading event occurs according to the electricity data measured by the power measuring unit 121. If the loading event occurs, the processing unit 122 executes the step S330 to perform data compression on the electricity data obtained during the event period (referring to related description of FIG. 1), so as to obtain the compressed data.

Figure 4:
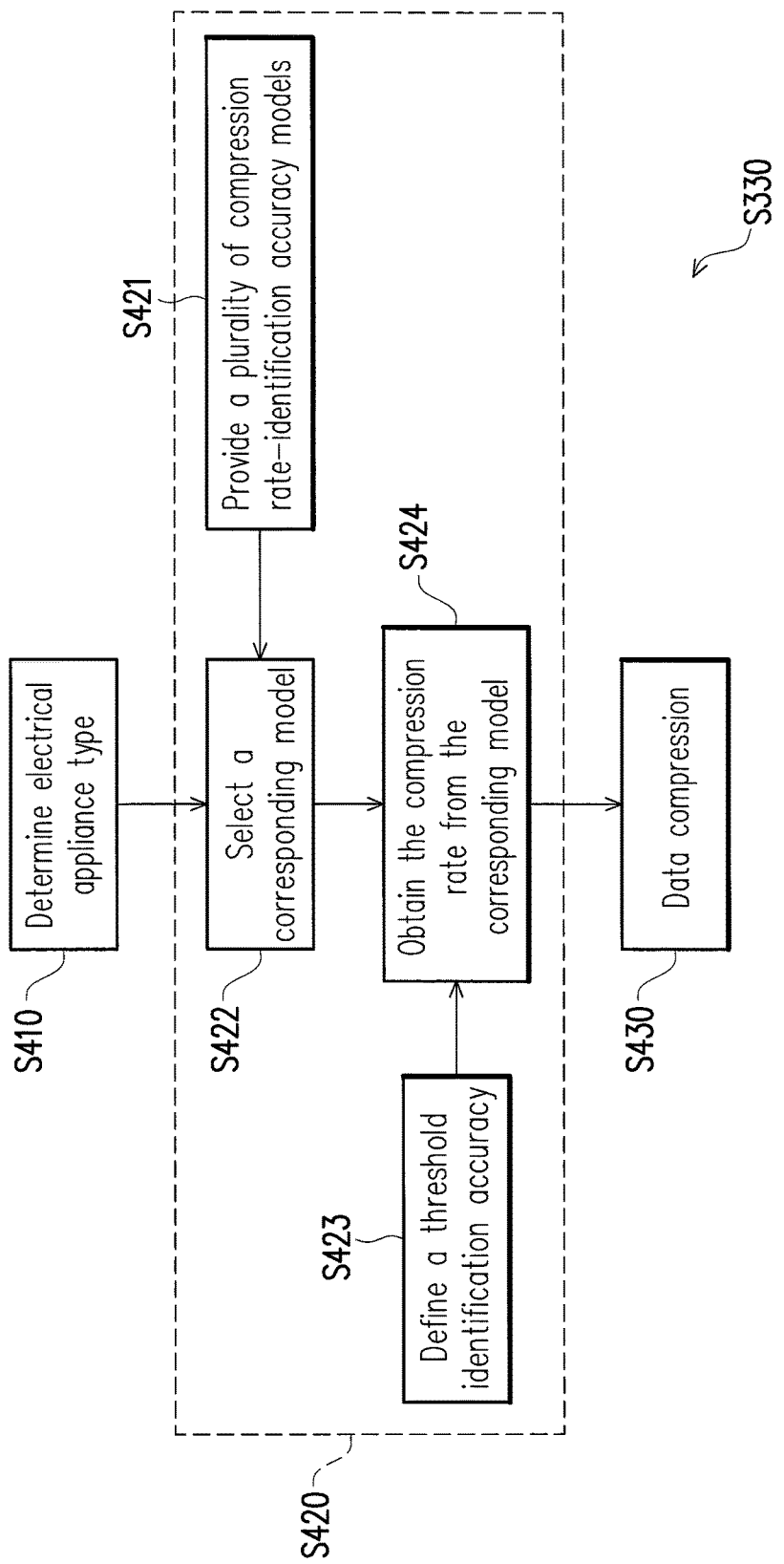
FIG. 4 is a flowchart illustrating an operation method that a smart meter performs data compression according to an embodiment of the disclosure.

The method of data compression executed in the step S330 is not limited by the disclosure. For example, FIG. 4 is a flowchart illustrating an operation method that the smart meter performs data compression according to an embodiment of the disclosure. Different types of the electrical appliances have different influences on accuracy of the load identification in case of different compression rates. The embodiment of FIG. 4 can be deduced according to related descriptions of FIG. 1 to FIG. 3. Referring to FIG. 2 and FIG. 4, in order to effectively increase compression rates of current waveforms of different types of the electrical appliances, the processing unit 122 executes a step S410 to analyze the electricity data obtained during the event period, so as to determine the type of the electrical appliance corresponding to the loading event.

Figure 5C:
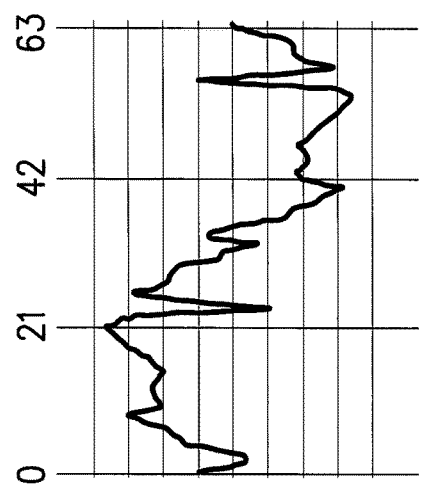
FIG. 5A, FIG. 5B and FIG. 5C are schematic diagrams of current waveforms of different load types according to an embodiment of the disclosure.
Figure 5B:
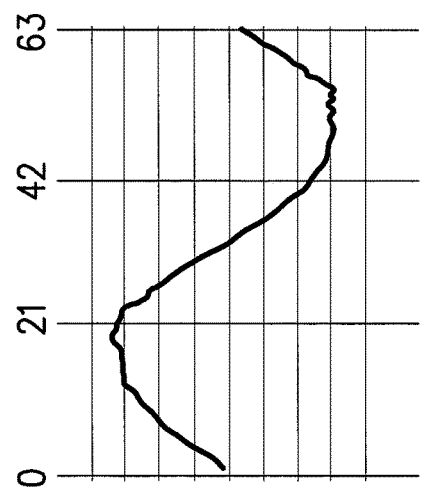
Figure 5A:
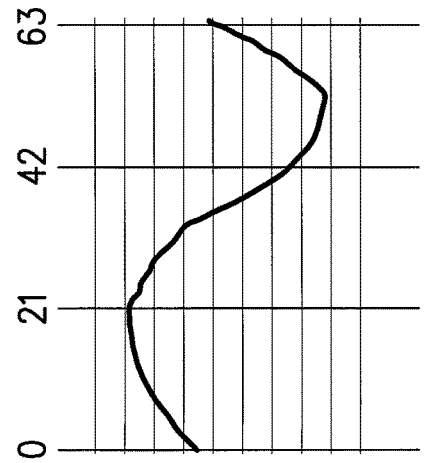

The method of determining the type of the electrical appliance executed in the step S410 is not limited by the disclosure. For example, in some embodiments, if the electricity data/power characteristic provided by the power measuring unit 121 includes current waveform data, the processing unit 122 can identify a load type (the type of the electrical appliance) according to the current waveform data. Different types of the electrical appliances may have different current waveform patterns due to characteristics of internal components thereof. FIG. 5A, FIG. 5B and FIG. 5C are schematic diagrams of current waveforms of different load types according to an embodiment of the disclosure. In FIG. 5A, FIG. 5B and FIG. 5C, vertical axes represent current values and horizontal axes represent time. FIG. 5A illustrates a current waveform of a resistance type electrical appliance (for example, a hair dryer). The commonly used resistance type electrical appliances include incandescent bulbs, hair dryers, kettles and heaters, etc. The resistance type electrical appliances are generally electrical appliances providing heat sources, and current waveforms thereof are generally complete sine waves. FIG. 5B illustrates a current waveform of an inductance type electrical appliance (for example, an air cleaner). The commonly used inductance type electrical appliances include motor type loads. Virtual powers of the inductance type loads are significant, which includes electric fans, refrigerators, air conditioners, water pumps and cooling fans, etc. FIG. 5C illustrates a current waveform of a fluorescent lamp. By identifying the current waveforms, the processing unit 122 can identify a load type (the type of the electrical appliance) of the electrical appliance triggering the "loading event".

Moreover, liquid crystal displays, notebook computers and printers, etc. are electronic type electrical appliances. In the current waveforms of the electronic type electrical appliances, harmonic components are very high due to that a direct current (DC) power supply is generally used. Therefore, after the utility power is input, full-bridge rectifying and buck processing are required in a transformer. In the power network, components with frequencies higher than a fundamental wave are all harmonics. The harmonics can be directly provided by the power measuring unit 121, or can be obtained through calculation according to the current waveform provided by the power measuring unit 121.

In some other embodiments, if the electricity data/power characteristic provided by the power measuring unit 121 includes a real power value and a virtual power value, the processing unit 122 can identify the load type (the type of the electrical appliance) according to the real power value and the virtual power value. For example, the processing unit 122 can determine whether a ratio between the real power value and the virtual power value is greater than a threshold value. If the ratio between the real power value and the virtual power value is greater than the threshold value, the processing unit 122 determines the type of the electrical appliance triggering the "loading event" to be the resistance type. The real power value can be directly provided by the power measuring unit 121, or can be obtained through calculation according to the voltage and current provided by the power measuring unit 121. For example, the processing unit 122 can take a cosine value of a phase difference between the voltage and the current provided by the power measuring unit 121, and then integrates a multiplication of the voltage, the current and the cosine value to obtain the real power value. The virtual power value represents loss energy generated when the voltage V and the current I have a phase difference. The virtual power value can be directly provided by the power measuring unit 121, or can be obtained by subtracting the real power value from a value obtained by integrating a multiplication of the voltage and the current provided by the power measuring unit 121.

In some other embodiments, if the electricity data/power characteristic provided by the power measuring unit 121 includes voltage-current curve data, the processing unit 122 can identify the load type (the type of the electrical appliance) according to voltage-current curve data. For example, the processing unit 122 of the smart meter 120 can determine the type of the electrical appliance according to an enclosed area of the voltage-current curve corresponding to the voltage-current curve data. The calculating method of the enclosed area of the voltage-current curve is well known by those skilled in the art, which is not repeated. FIG. 6A, FIG. 6B and FIG. 6C are schematic diagrams of voltage-current curves of different load types according to an embodiment of the disclosure. In FIG. 6A, FIG. 6B and FIG. 6C, the vertical axes represent current values, and the horizontal axes represent voltages. FIG. 6A illustrates a voltage-current curve a resistance type electrical appliance (for example, start heating of electronic kettle), FIG. 6B illustrates a voltage-current curve of an electronic type electrical appliance (for example, a liquid crystal display), FIG. 6C illustrates a voltage-current curve of an inductance type electrical appliance (for example, a refrigerator). By determining the enclosed area of the voltage-current curve, the processing unit 122 of the smart meter 120 can identify a load type (the type of the electrical appliance) of the electrical appliance triggering the "loading event". For example, if the enclosed area of the voltage current curve is smaller than a first threshold value (i.e. the enclosed area is very small, as that shown in FIG. 6A), the processing unit 122 determines the type of the electrical appliance triggering the "loading event) to be the resistance type. For another example, if the enclosed area of the voltage current curve is greater than a second threshold value (i.e. the enclosed area is very large, as that shown in FIG. 6C), the processing unit 122 determines the type of the electrical appliance triggering the "loading event" to be the inductance type.

In some embodiments, the voltage-current curve can be divided into a left segment 610, a middle segment 620 and a right segment 630. The processing unit 122 can identify the load type (the type of the electrical appliance) according to the enclosed areas of the left segment 610, the middle segment 620 and the right segment 630. For example, if the enclosed areas of the left segment 610, the middle segment 620 and the right segment 630 are all smaller than the first threshold value (i.e. the enclosed areas of the three segments are very small, as that shown in FIG. 6A), the processing unit 122 determines the type of the electrical appliance triggering the "loading event" to be the resistance type. For another example, if the enclosed areas of the left segment 610 and the right segment 630 are all greater than the first threshold value, and the enclosed area of the middle segment 620 is smaller than the first threshold value (i.e. the enclosed areas are concentrated in the left segment 610 and the right segment 630, and the enclosed area of the middle segment 620 is very small, as that shown in FIG. 6B), the processing unit 122 determines the type of the electrical appliance triggering the "loading event" to be the electronic type. For another example, if the enclosed area of the middle segment 620 is greater than the second threshold value, and the enclosed area of the left segment 610 and the right segment 630 are all smaller than the second threshold value, (i.e. the enclosed area of the middle segment 620 is very large, and the enclosed areas of the left segment 610 and the right segment 630 are smaller, as that shown in FIG. 6C), the processing unit 122 determines the type of the electrical appliance triggering the "loading event" to be the inductance type.

Figure 7:
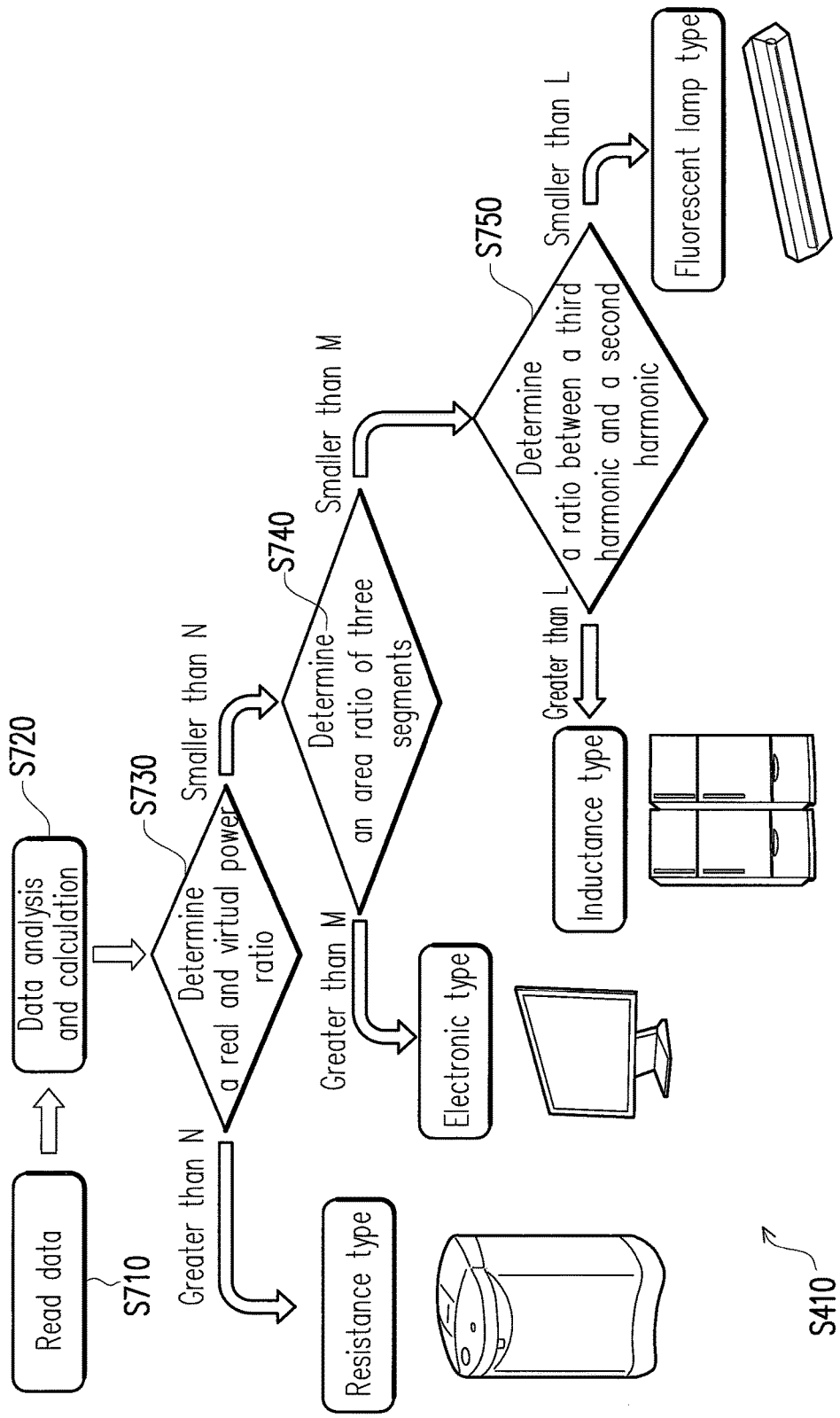
FIG. 7 is a flowchart illustrating a method for determining an electrical appliance type according to an embodiment of the disclosure.

The method for determining the type of the electrical appliance of the step S410 of FIG. 4 is not limited as that described above. For example, FIG. 7 is a flowchart illustrating a method for determining an electrical appliance type according to an embodiment of the disclosure. In the embodiment of FIG. 7, calculations and comparisons are performed on power characteristic values such as a real-virtual power ratio, the voltage-current curve and a harmonic content, etc. The processing unit 122 executes a step S710 to read electricity data/power characteristic from the power measuring unit 121. The processing unit 122 executes a step S720 to analyze/calculate the ratio between the real power and the virtual power, a ratio between an enclosed area of the left and right segments and an enclosed area of the middle segment in the voltage-current curve, and a harmonic ratio (for example, a ratio between a third harmonic and a second harmonic).

The processing unit 122 executes a step S730 to determine a load real-virtual power ratio. In today's commonly used electrical appliances, the real-virtual power ratios of most of the electrical appliances are relatively small, while the real-virtual power ratios of the resistance type electrical appliances are relatively large. Therefore, in the step S730, the processing unit 122 can determine whether the ratio between the real power and the virtual power is greater than a threshold value N. If the ratio between the real power and the virtual power is greater than the threshold value N, the processing unit 122 determines the type of the electrical appliance triggering the "loading event" to be the resistance type.

If the ratio between the real power and the virtual power is smaller than the threshold value N, the processing unit 122 executes a step S740 to determine an area ratio of the three segments of the voltage-current curve, for example, an area ratio of the left segment 610, the middle segment 620 and the right segment 630 in FIG. 6A, FIG. 6B and FIG. 6C. The enclosed areas of the electronic type voltage-current curve are concentrated at two ends (as shown in FIG. 6B, the enclosed areas are concentrated in the left segment 610 and the right segment 630, and the enclosed area of the middle segment 620 is very smaller). In the step S740, the processing unit 122 determines whether a ratio between the enclosed area of the left segment 610 and the right segment 630 and the enclosed area of the middle segment 620 in the voltage-current curve is greater than a threshold value M. According to such characteristic, the electronic type load can be separated from the non-resistance type loads. If the aforementioned ratio is greater than the threshold value M, the processing unit 122 determines the type of the electrical appliance triggering the "loading event" to be the electronic type. If the ratio is smaller than the threshold value M, the processing unit 122 determines the type of the electrical appliance to be the inductance type.

A load power of a fluorescent lamp is smaller, and a current thereof is liable to be influenced by a driver of a previous stage to cause a low identification rate. Moreover, electrical characteristics of the fluorescent lamp have little difference with that of the motor type (inductance type) load. Therefore, when the ratio between the enclosed area of the left and right segments and the enclosed area of the middle segment in the voltage-current curve is smaller than the threshold value M, the processing unit 122 executes a step S750 to effectively distinguish the motor type (inductance type) load and the fluorescent lamp type load. In the present embodiment, the harmonic ratio is the ratio between the third harmonic and the second harmonic. In the step S750, the processing unit 122 determines whether the harmonic ratio is greater than a threshold value L. If the harmonic ratio is greater than the threshold value L, the processing unit 122 determines the type of the electrical appliance triggering the "loading event" to be the inductance type. If the harmonic ratio is smaller than the threshold value L, the processing unit 122 determines the type of the electrical appliance to be the fluorescent lamp type.

Referring to FIG. 2 and FIG. 4, the processing unit 122 executes a step S420 to dynamically determine a compression rate of data compression in a step S430 according to the type of the electrical appliance determined in the step S410. In the present embodiment, the step S420 includes steps S421-S424. In the step S421, the processing unit 122 provides a plurality of compression rate-identification accuracy models corresponding to different electrical appliance types. The electrical appliance type includes the resistance type, the electronic type, the inductance type or the fluorescent lamp type. Different electronic appliance types may have different compression rate-identification accuracy models $a=f_i(cp)$, where cp is a compression rate, a is an identification accuracy, and i=1 is the resistance type, i=2 is the electronic type, i=3 is the inductance type, and i=4 is the fluorescent lamp type. The identification accuracy a represents identification accuracy obtained when the remote server 110 performs the load identification (for example, the step S370 of FIG. 3).

For example, FIG. 8A and FIG. 8B are schematic diagrams of different compression rate-identification accuracy models $a=f_i(cp)$ corresponding to different electrical appliance types according to an embodiment of the disclosure. Vertical axes of FIG. 8A and FIG. 8B represent the identification accuracy a, and horizontal axes represent the compression rate cp. FIG. 8A illustrates the compression rate-identification accuracy model $a=f_4(cp)$ of the fluorescent lamp type load, and FIG. 8B illustrates the compression rate-identification accuracy model $a=f_1(cp)$ of the resistance type load. According to FIG. 8A, it is known that when the compression rate of the fluorescent lamp type load is 0.5, the identification accuracy drops to 80% or less, and according to FIG. 8B, when the compression rate of the resistance type load is 0.75, the identification accuracy is still close to 100%.

The processing unit 122 executes the step S422 to select one of compression rate-identification accuracy models $a=f_i(cp)$ provided in the step S421 according to the electrical appliance type determined by the step S410. In some embodiments, different lookup tables can be used to implement different models $a=f_i(cp)$. For example, a first lookup table can record a corresponding relationship between the identification accuracy a and the compression rate cp of a model curve 812 in FIG. 8A, and a second lookup table can record a corresponding relationship between the identification accuracy a and the compression rate cp of a model curve 822 in FIG. 8B. Therefore, in the step S422, the processing unit 122 can select the corresponding lookup table (the corresponding model $a=f_i(cp)$) from different lookup tables according to the electrical appliance type determined in the step S410.

In some other embodiments, different equations can be used to respectively implement the different models $a=f_i(cp)$. For example, a first equation $a=0.9091(cp)^2-24.909 cp+122.73$ can represent a corresponding relationship between the identification accuracy a and the compression rate cp of a model curve 811 in FIG. 8A, and a second equation $a=15.909(cp)^2+60.455 cp+52.273$ can represent a corresponding relationship between the identification accuracy a and the compression rate cp of a model curve 821 in FIG. 8B. Therefore, in the step S422, the processing unit 122 can select the corresponding equation (the corresponding model $a=f_i(cp)$) from different equations according to the electrical appliance type determined in the step S410.

Referring to FIG. 2 and FIG. 4, the processing unit 122 executes a step S423 to define a threshold identification accuracy. The threshold identification accuracy is the lowest identification accuracy that can be tolerated when the remote server 110 performs the load identification (for example, the step S370 of FIG. 3). The threshold identification accuracy is determined according to a design requirement of the system. The processing unit 122 executes the step S424 to obtain a compression rate of the step S430 from the corresponding model selected in the step S422 according to the threshold identification accuracy defined in the step S423. For example, if the threshold identification accuracy defined in the step S423 is 80%, cp=80% is input to the corresponding model a=$f_i$(cp) selected in the step S422 to obtain the compression rate a of the step S430.

In other embodiments, a lookup table and an equation can be simultaneously used to implement the same compression rate-identification accuracy model a=$f_i$(cp). Taking the compression rate-identification accuracy model a=$f_4$(cp) of the fluorescent lamp type of FIG. 8A as an example, the processing unit 122 can simultaneously use the model curve 811 (the equation) and the model curve 812 (the lookup table) to describe the compression rate-identification accuracy model a=$f_4$(cp) of the fluorescent lamp type. Under such implementation condition, if the identification accuracy is set to be higher than 80%, the processing unit 122 can find/interpolate a first compression rate with the identification accuracy of 80% from the lookup table, and calculate a second compression rate with the identification accuracy of 80% according to the equation. The processing unit 122 can obtain a higher one of the first compression rate and the second compression rate to implement the data compression of the power characteristic of the step S430.

Referring to FIG. 2 and FIG. 4, the processing unit 122 executes the step S430 to perform data compression on the electricity data obtained during the "event periods" (referring to the related description of FIG. 1) according to the compression rate determined in the step S420, so as to obtain compressed data. For example, it is assumed that the electricity data includes the current waveform data, in the step S430, the processing unit 122 finds sampling point position information from the lookup table according to the electrical appliance type determined in the step S410 and the compression rate determined in the step S420. Then, in the step S430, the processing unit 122 abandons a part of content of the current waveform data according to the sampling point position information to obtain the compressed data and generate compressed power characteristic data packets. The content of the lookup table of the step S430 can be set according to an actual design requirement of the system. For example, the table 1 is a lookup table of the step S430 according to an embodiment of the disclosure.

TABLE 1

Lookup table of data compression

| index code | Periodic wave sampling number | Compression rate | Sampling point position |
|---|---|---|---|
| 1 | 64 | 0.5 | 2, 4, 6, . . . 62, 64 |
| 2 | 64 | 0.14 | 3, 8, 19, 30, 35, 41, 52, 58, 63 |
| 3 | 32 | 0.25 | 1, 3, 5, 15, 16, 28, 30, 32 |
| 4 | 128 | 0.75 | 4, 6, 23, 24, 25, . . . 114, 115, 128 |
| . . . | . . . | . . . | . . . |

The table 1 includes an index code field, a periodic wave sampling number field, a compression rate field and a sampling point position field. For example, when the control number is 1, the periodic wave sampling number is 64, which represents that one period of the current waveform has 64 sampling points. When the control number is 1, the compression rate is 0.5, which represents that a data amount after the compression is a half that of the original current waveform data. In other words, the 64 sampling points in one period are changed to 32 sampling points after the compression. When the index code is 1, the content of the sampling point position field (i.e. the sampling point position information) indicates that the $2^{nd}$, $4^{th}$, $6^{th}$, $62^{th}$ and $64^{th}$ sampling points in the original 64 sampling points are retained, and the other sampling points are abandoned. It should be noticed that positions of the retained sampling points can be evenly distributed, or can be unevenly distributed. For example, when the index code is 3, the positions of the sampling points are 1, 3, 5, 15, 16, 28, 30 and 32, where spacing distances of the sampling points are different.

In the step S430, the processing unit 122 produces the compressed data into the power characteristic data packets. FIG. 9A is a schematic diagram illustrating a data structure of a packet according to an embodiment of the disclosure. FIG. 9B is a schematic diagram illustrating a data structure of a packet according to another embodiment of the disclosure. A type code represents a type of the packet. For example, the type code indicates whether the current waveform data and the other power characteristics (for example, the real power value, the virtual power value and the harmonic value, etc.) are integrated into a same packet (shown in FIG. 9A), or the current waveform data and the other power characteristics are separated into two packets for transmission (shown in FIG. 9B). A start code is used to indicate a start point of the current waveform data to separate from the other waveform data or the other power characteristics. The content of the index code field may refer to the related description of the table 1. A sampling value represents a value of each sampling point in the current waveform. The content in each pair of brackets of FIG. 9A and FIG. 9B schematically indicates a bit number, though the bit number in each field of an actual packet is not limited thereto.

Figure 10:
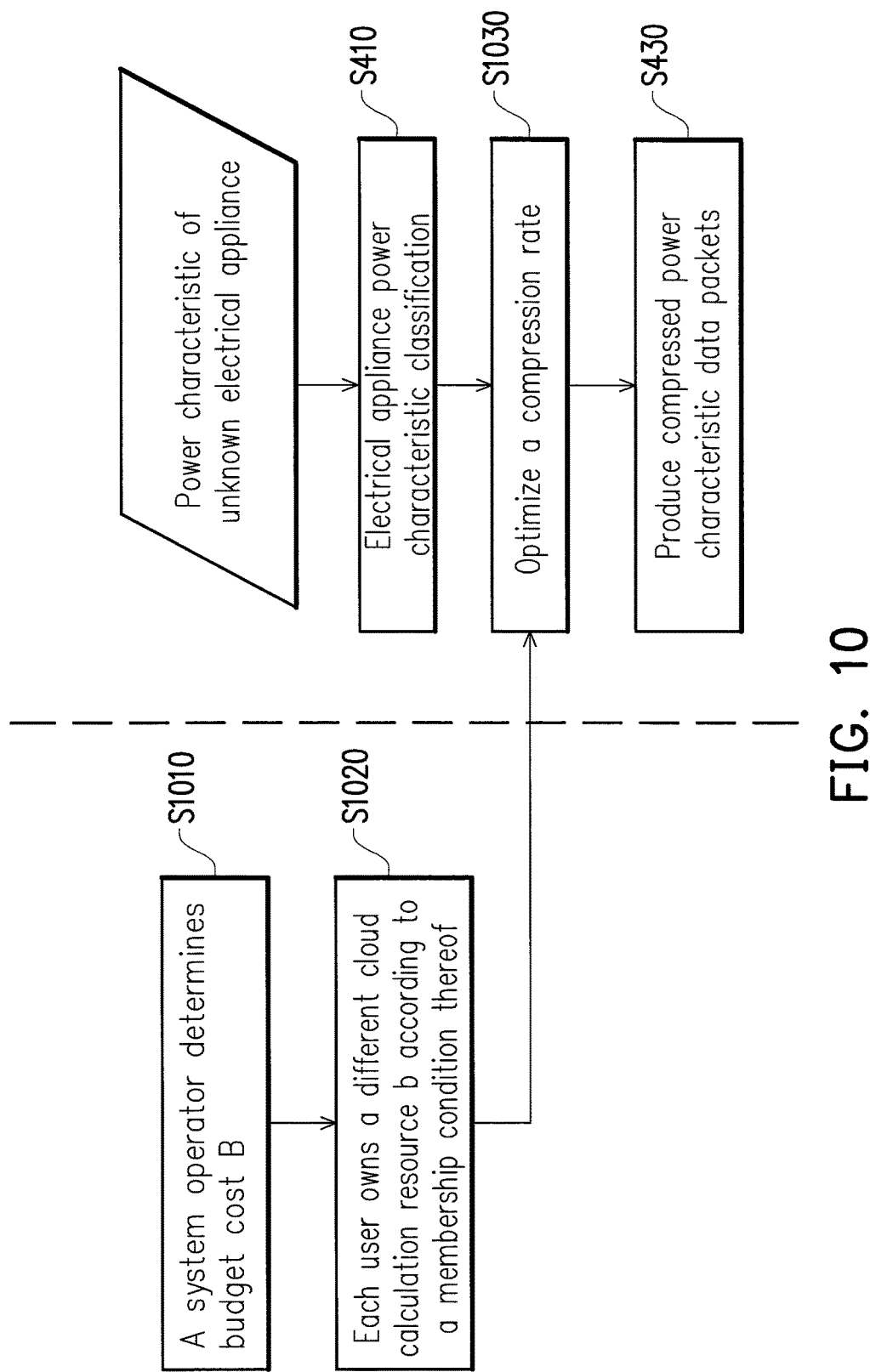
FIG. 10 is a flowchart illustrating an operation method of data compression performed by a smart meter according to an embodiment of the disclosure.

The data compression method of the step S330 of FIG. 3 is not limited to the embodiment of FIG. 4. For example, FIG. 10 is a flowchart illustrating an operation method of data compression performed by a smart meter according to an embodiment of the disclosure. The embodiment of FIG. 10 can be deduced according to related descriptions of FIG. 1 to FIG. 9. Referring to FIG. 10, in step S1010, a system operator determines a budget cost B, and allocates different cloud calculation resources b according to a membership condition of each user. For example, taking the application of FIG. 1 as an example, it is assumed that the system operator has three members of a user A, a user B and a user C. Membership levels of the user A, the user B and the user C are respectively a first class member, a second class member and a third class member. If the budget cost B of the system operator is 1000 dollars, the system operator can allocate the 1000 dollars to the user A, the user B and the user C according to the membership conditions, such that the cloud calculation resources b of the user A, the user B and the user C are respectively (for example) 600 dollars, 300 dollars and 100 dollars.

A following table 2 lists charging standards of different cloud platforms according to an embodiment of the disclosure. Data of the table 2 is obtained through calculation based on following assumptions: 1. Each time when the loading event occurs, the current waveform within a time range of 10 seconds before and after occurrence of the loading event; 2. It is assumed that 100 loading events occur every data, the data amount of each day is 7,500 KB, and the load identification result of the electrical appliance is recorded; 3. It is assumed that 10,000 members use the cloud platform service for one month. The currency unit of the costs listed in the table 2 is U.S. dollar.

TABLE 2 charging standards of different cloud platforms

| Cloud | Bandwidth | Storage | Calculation | Total |
|---|---|---|---|---|
| G company | 260 (0.12 dollar/GB) | 540 (0.1 dollar/ 100 KB) | 70 (0.08 dollar/ hour) | 870 |
| A company | 260 (0.201 dollar/GB) | 260 (0.12 dollar/ GB) | 136 (0.078 dollar/ hour) | 796 |

According to the embodiment of FIG. 2, it is known that the cloud platform services provided by different companies have different charging standards. For example, a bandwidth unit price $U_b$ of a G company is 0.12 dollar for every 1 GB bandwidth, a storage unit price $U_s$ is 0.1 dollar per month for every 100 KB data, and a calculation unit price $U_c$ is 0.08 dollar for every one hour's calculation.

When the processing unit 122 detects an unknown power characteristic, the processing unit 122 performs electrical appliance power characteristic classification in the step S410 (referring to the related description of the step S410 of FIG. 4). After the type of the electrical appliance is determined, in step S1030, the processing unit 122 determines a compression rate of data compression performed in the step S430. The step S1030 of FIG. 10 can be deduced according to the related description of the step S420 of FIG. 4, and a difference there between is that in the step S1030 of FIG. 10, the processing unit 122 of the smart meter 120 can further resolve a following optimization problem through an optimization algorithm (for example, by using a Lagrange multiplier):

Adjust cp, max $f_i(cp)$
In subject to
$R_b + R_s + R_c \leq b$
where
$R_b = g_b(D, cp, U_b)$
$R_s = g_s(D, cp, U_s)$
$R_c = g_c(D, cp, U_c)$ Where, D is an amount of data uploaded to the remote server, $U_b$ is the bandwidth unit price, $R_b$ is bandwidth cost, $U_s$ is a storage unit price, $R_s$ is storage cost, $U_c$ is a calculation unit price, $R_c$ is calculation cost, b is a cost amount (i.e. cloud calculation resources allocated to the users by the system operator), $R_b$, $R_s$ and $R_c$ are functions of the power characteristic data amount D, the compression rate cp and the unit costs $U_b$, $U_s$ and $U_c$. $U_b$, $U_s$ and $U_c$ relate to different cloud charging mechanisms. The Lagrange multiplier is a known technique, and details thereof are not repeated. Therefore, under the limited cost amount b, the processing unit 122 can maximize the identification accuracy a by determining the compression rate cp.

Generally, when the power characteristic compression rate cp is enhanced, the bandwidth cost $R_b$ and the storage cost $R_s$ are decreased, however, since a decompression operation is additionally required, and auxiliary load identification of other multi power characteristics is required, the calculation cost $R_c$ is increased. In collaboration with different charging mechanisms of the cloud platform services provided by different companies, in the step S1030 of FIG. 10, the Lagrange multiplier can be used to find a cp value, so as to dynamically adjust the compression rate cp of the current waveform data under limited budget cost to achieve the highest load identification accuracy a (i.e. $f_i(cp)$).

Referring to FIG. 2 and FIG. 3, after data compression of the step S330 is completed, the processing unit 122 executes a step S340 to upload data packets containing the compressed data to the remote server 110 through the communication unit 123. According to different design requirements of different embodiments, the electricity data or the compressed data may include a real power value, a virtual power value, a harmonic value, current waveform data, voltage waveform data and/or other electrical characteristic data.

The remote server 110 manages the smart meter 120 through the communication network. In step S350, the processing unit 112 of the remote server 110 receives the compressed data uploaded by the smart meter 120 through the communication unit 111. The processing unit 112 executes a step S360 to perform data decompression on the compressed data to obtain decompressed data.

Since the packets containing the compressed data include the index code (referring to related descriptions of FIG. 9A, FIG. 9B and the table 1), in the step S360, the processing unit 112 can obtain the index code from the packets containing the compressed data, and according to the index code, the processing unit 112 may find the sampling point position information from the lookup table (for example, the table 1). According to the sampling point position information, the processing unit 112 can perform data decompression on the compressed data by using an interpolation method to obtain the decompressed data. For example, the processing unit 112 can learn a periodic wave sampling number and positions of the sampling values in the waveform according to the control number in the packet. Then, the processing unit 112 can perform the interpolation operation on the sampling values in the packet according to the sampling point position information, so as to recover a simplified sampling rate to an original sampling rate (i.e. the periodic wave sampling number). The interpolation operation can be a linear interpolation or other algorithm. The interpolation operation is a known technique, which is not repeated herein.

Referring to FIG. 2 and FIG. 3, after the data decompression of the step S360 is completed, the processing unit 112 executes a step S370 to perform load identification according to the decompressed data of the step S360. In the present embodiment, the decompressed data includes a plurality of power characteristics (for example, a real power value, a virtual power value, a harmonic value, transient data, current waveform data, voltage waveform data or other electrical characteristics). In the step S370, the processing unit 112 performs the load identification on a plurality of electrical appliance samples in the electrical appliance power characteristic database 113 according to the power characteristics. The processing unit 112 determines the electrical appliance corresponding to the compressed data according to the load identification result.

A data structure of the electrical appliance samples in the electrical appliance power characteristic database 113 can be determined according to an actual design requirement of the system. For example, a following table 3 is a power characteristic database established according to a test/analysis result after testing/analyzing a certain electrical appliance (which is referred to as an electrical appliance sample A) in advance.

TABLE 3 power characteristic database of the electrical appliance sample A

| Sample characteristic | Real power value | Current waveform data |
|---|---|---|
| Content | 100 | Data stream DSA |
| Power characteristic weighting | 1 | 0.8 |

The power characteristic weighting relates to a repetition rate of the corresponding sample characteristic. For example, the power characteristics of the electrical appliance sample A are tested/analyzed for multiple times (for example, 100 times) in advance, where in the 100 testing processes, the real power values of the electrical appliance sample A are all about 100 watts. Since the repetition rate of the real power value of the electrical appliance sample A is about 100%, the power characteristic weighting of the real power value of the electrical appliance sample A can be set to 1 to serve as a reference basis.

For another example, the current waveform data of the electrical appliance sample A is tested/analyzed for multiple times (for example, 10 times) in advance, where in the 10 testing processes, the current waveform data of the electrical appliance sample A is approximately complied with the data stream DSA of the table 3 in 8 testing processes, and in the other 2 testing processes, the current waveform data of the electrical appliance sample A is not complied with the data stream DSA. Since the repetition rate of the current waveform data of the electrical appliance sample A is about 80%, the power characteristic weighting of the current waveform data of the electrical appliance sample A can be set to 0.8.

Deduced by analogy, a plurality of different electrical appliance samples can be established in the electrical appliance power characteristic database 113. For example, referring to the related description of the above table 3, after another electrical appliance (which is referred to as an electrical appliance sample B) is tested/analyzed, the power characteristic database of the electrical appliance sample B is established in the electrical appliance power characteristic database 113. For example, table 4 lists the content of the power characteristic database established according to the test/analysis result after testing/analyzing the electrical appliance sample A.

TABLE 4 power characteristic database of the electrical appliance sample B

| Sample characteristic | Real power value | Current waveform data |
|---|---|---|
| Content | 80 | Data stream DSA |
| Power characteristic weighting | 0.5 | 0.9 |

In the present embodiment, the step S370 includes steps S372, S374 and S376. The processing unit 112 executes the step S372 to dynamically adjust at least one of the power characteristic weightings in the power characteristic database according to the compression rate cp of the compressed data uploaded by the smart meter 120. For example, although the type of the electrical appliance can be accurately determined/identified by using the current waveform, the compressed/decompressed current waveform is probably distorted, which may influence the identification accuracy of the step S370. Therefore, in the step S372, the processing unit 112 can dynamically adjust the power characteristic weighting of the current waveform data. The processing unit 112 can calculate a following equation (1) to obtain the adjusted power characteristic weighting $W_i$.

$$W_i = W_j * (1-cp) \qquad \text{equation (1)}$$

Where, $W_j$ is an original power characteristic weighting recorded in the electrical appliance power characteristic database 113, and cp is the compression rate. For example, it is assumed that the compression rate cp of the compressed data uploaded by the smart meter 120 is 0.1, according to the original power characteristic weighting $W_j$ (i.e. 0.8) of the current waveform data of the electrical appliance sample A in the table 3, the processing unit 112 can calculate the adjusted power characteristic weighting $W_i = 0.8*(1-0.1) = 0.72$. It should be noticed that the processing unit 112 does not rewrite the power characteristic weighting $W_j$ recorded in the electrical appliance power characteristic database 113 according to the calculated power characteristic weighting $W_i$.

Deduced by analogy, according to the original power characteristic weighting $W_j$ (i.e. 0.9) of the current waveform data of the electrical appliance sample B in the table 4, the processing unit 112 can calculate the adjusted power characteristic weighting $W_i = 0.9*(1-0.1) = 0.81$. Regarding the other power characteristics (for example, the real power value) that the power characteristic weightings thereof are not dynamically adjusted, a relationship between the adjusted power characteristic weighting $W_i$ and the original power characteristic weighting $W_j$ is shown as an equation (2):

$$W_i = W_j \qquad \text{equation (2)}$$

After the step S372 is completed, the processing unit 112 executes the step S374 to perform the load identification according to the adjusted power characteristic weighting $W_i$ of the step S372. In the present embodiment, the processing unit 112 calculates an equation (3) in the step S374 to obtain similarity between a power characteristic contained in the decompressed data of the step S360 and a sample characteristic of the electrical appliance sample.

$$SR_i = 1 - (|FE_i - FS_i|/FS_i) \qquad \text{equation (3)}$$

Where, $FE_i$ is one of the electrical characteristics contained in the decompressed data of the step S360, $FS_i$ is a sample characteristic corresponding to $FE_i$ in a plurality of sample characteristics corresponding to the electrical appliance samples, and $SR_i$ is similarity between $FE_i$ and $FS_i$.

After the similarities $SR_i$ of different power characteristic types are obtained, in the step S374, the processing unit 112 uses a following equation (4) to calculate weighted similarity between the power characteristic contained in the decompressed data of the step S360 and the corresponding electrical appliance sample according to the similarity $SR_i$ and the corresponding power characteristic weighting:

$$SW = \frac{\left(\sum_{i=1}^{n} W_i \times SR_i\right)}{\left(\sum_{i=1}^{n} W_i\right)} \qquad \text{equation (4)}$$

Where, $W_i$ is the power characteristic weighting corresponding to the similarity $SR_i$, SW is the weighted similarity.

For example, taking the electrical appliance sample A of the table 3 and the electrical appliance sample B of the table 4 as an example, weighted similarities between the power characteristic contained in the decompressed data of the step S360 and the sample characteristics of the electrical appliance samples A and B are shown in a following table 5:

TABLE 5 weighted similarity

| Power characteristic | Real power value | Current waveform data | Weighted similarity |
|---|---|---|---|
| Smart meter | 107 | Data stream DSm | |
| Electrical appliance sample A | 93% | 95% | 93.8% |
| Electrical appliance sample B | 66.3% | 60% | 62.4% |

In the example of the table 5, it is assumed that the power characteristics contained in the decompressed data of the step S360 include the real power value and the current waveform data, and contents thereof are respectively 107 watts and data stream DSm. Taking the real power value (i.e. 100 watts) of the electrical appliance sample A of the table 3 as an example, the similarity $SR_i=1-(|107-100|/100)=93\%$, as that shown in the table 5. Taking the real power value (i.e. 80 watts) of the electrical appliance sample B of the table 4 as an example, the similarity $SR_i=1-(|107-80|/80)=66.3\%$, and the other power characteristic types can be deduced by analogy.

After the similarity $SR_i$ is obtained, the processing unit 112 uses the equation (4) to calculate weighted similarity SW between the power characteristic contained in the decompressed data of the step S360 and the corresponding electrical appliance sample. For example, taking the electrical appliance sample A of the table 3 as an example, the weighted similarity $SW=(1*0.93+0.72*0.95)/1+0.72)=93.8\%$, as that shown in the table 5. Deduced by analogy, taking the electrical appliance sample B of the table 4 as an example, the weighted similarity $SW=(0.5*0.663+0.81*0.6)/0.5+0.81)=62.4\%$.

After the step S374 is completed, the processing unit 112 executes the step S376 to perform the load identification. In the present embodiment, the step S376 is to determine the electrical appliance corresponding to the compressed data according to the weighted similarity SW of the step S374. For example, taking the weighted similarities of the table 5 as an example, the weighted similarity SW of the electrical appliance sample A is greater than the weighted similarity SW of the electrical appliance sample B, so that in the step S376, the processing unit 112 can determine that the electrical appliance corresponding to the compressed data of the step S350 is similar to the electrical appliance sample A.

After the load identification (the step S370) is completed, in step S380, the processing unit 112 counts/analyzes the result of the load identification. For example, the processing unit 112 counts the result of the load identification of the step S370 to obtain accumulated electricity consumption of different electrical appliances in the user's home within one month.

However, the embodiments of the disclosure are not limited as that described above. For example, the sample power characteristics in the power characteristic database are not limited as that shown in the table 3 and the table 4. In some other embodiments, data content of the electrical appliance samples in the electrical appliance power characteristic database 113 may include the real power value, the virtual power value, the current waveform data and a first order harmonic value. For example, a table 6 lists content of the power characteristic database established according to a test/analysis result obtained after testing/analysing the electrical appliance sample A.

TABLE 6 power characteristic database of the electrical appliance sample A

| Sample characteristic | Real power value | Virtual power value | Current waveform data | First order harmonic value |
|---|---|---|---|---|
| Content | 100 | 10 | Data stream DSA | 5 |
| Power characteristic weighting | 1 | 0.5 | 0.8 | 0.5 |

The data content of the electrical appliance samples in the electrical appliance power characteristic database 113 may further include the electrical appliance sample B. For example, a following table 7 lists content of the power characteristic database established according to a test/analysis result obtained after testing/analysing the electrical appliance sample B.

TABLE 7 power characteristic database of the electrical appliance sample B

| Sample characteristic | Real power value | Virtual power value | Current waveform data | First order harmonic value |
|---|---|---|---|---|
| Content | 80 | 6 | Data stream DSB | 3 |
| Power characteristic weighting | 0.5 | 0.5 | 0.9 | 0.7 |

In the step S372, the processing unit 112 dynamically adjusts at least one of the power characteristic weightings in the power characteristic database according to the compression rate cp of the compressed data uploaded by the smart meter 120. For example, in the step S372, the processing unit 112 can use the equation (1) to dynamically adjust the power characteristic weighting of the current waveform data.

For example, it is assumed that the compression rate cp of the compressed data uploaded by the smart meter 120 is 0.1, according to the original power characteristic weighting $W_j$ (i.e. 0.8) of the current waveform data of the electrical appliance sample A in the table 6, the processing unit 112 can calculate the adjusted power characteristic weighting $W_i=0.8*(1-0.1)=0.72$. Deduced by analogy, according to the original power characteristic weighting $W_j$ (i.e. 0.9) of the current waveform data of the electrical appliance sample B in the table 7, the processing unit 112 can calculate the adjusted power characteristic weighting $W_i=0.9*(1-0.1)=0.81$. Regarding the other power characteristics (for example, the real power value) that the power characteristic weightings thereof are not dynamically adjusted, the adjusted power characteristic weighting $W_i$=the original power characteristic weighting $W_j$.

In the step S374, the processing unit 112 calculates the equation (3) to obtain the similarity $SR_i$ between a power characteristic contained in the decompressed data of the step S360 and a sample characteristic of the electrical appliance sample. After the similarities $SR_i$ of different power characteristic types are obtained, in the step S374, the processing unit 112 uses the equation (4) to calculate weighted similarity between the power characteristic contained in the decompressed data of the step S360 and the corresponding electrical appliance sample according to the similarity $SR_i$ and the corresponding power characteristic weighting. For example, taking the electrical appliance sample A of the table 6 and the electrical appliance sample B of the table 7 as an example, weighted similarities between the power characteristic contained in the decompressed data of the step S360 and the sample characteristics of the electrical appliance samples A and B are shown in a following table 8:

TABLE 8

| Power characteristic | weighted similarity | | | | |
|---|---|---|---|---|---|
| | Real power value | Virtual power value | Current waveform data | First order harmonic value | Weighted similarity |
| Smart meter | 107 | 9 | data stream DSm | 4 | |
| Electrical appliance sample A | 93% | 90% | 95% | 80% | 91% |
| Electrical appliance sample B | 66.3% | 50% | 60% | 67% | 61% |

In the example of table 8, it is assumed that the power characteristics contained in the decompressed data of the step S360 include the real power value, the virtual power value, the current waveform data and the first order harmonic value, and contents thereof are respectively 107 watts, 9 watts, data stream DSm and 4. Taking the real power value (i.e. 100 watts) of the electrical appliance sample A of the table 6 as an example, the similarity $SR_i=1-(|107-100|/100)=93\%$, as that shown in the table 8. Taking the real power value (i.e. 80 watts) of the electrical appliance sample B of the table 7 as an example, the similarity $SR_i=1-(|107-80|/80)=66.3\%$, and the other power characteristic types can be deduced by analogy.

After the similarity $SR_i$ is obtained, the processing unit 112 uses the equation (4) to calculate weighted similarity SW between the power characteristic contained in the decompressed data of the step S360 and the corresponding electrical appliance sample. For example, taking the electrical appliance sample A of the table 6 as an example, the weighted similarity $SW=(1*0.93+0.5*0.9+0.72*0.95+0.5*0.8)/(1+0.5+0.72+0.5)=91\%$, as that shown in the table 8. Deduced by analogy, taking the electrical appliance sample B of the table 7 as an example, the weighted similarity $SW=(0.5*0.663+0.5*0.5+0.81*0.6+0.7*0.67)/(0.5+0.5+0.81+0.7)=61\%$.

As shown in the table 8, the weighted similarity SW of the electrical appliance sample A is greater than the weighted similarity SW of the electrical appliance sample B, so that in the step S376, the processing unit 112 can determine that the electrical appliance corresponding to the compressed data of the step S350 is similar to the electrical appliance sample A.

Figure 11:
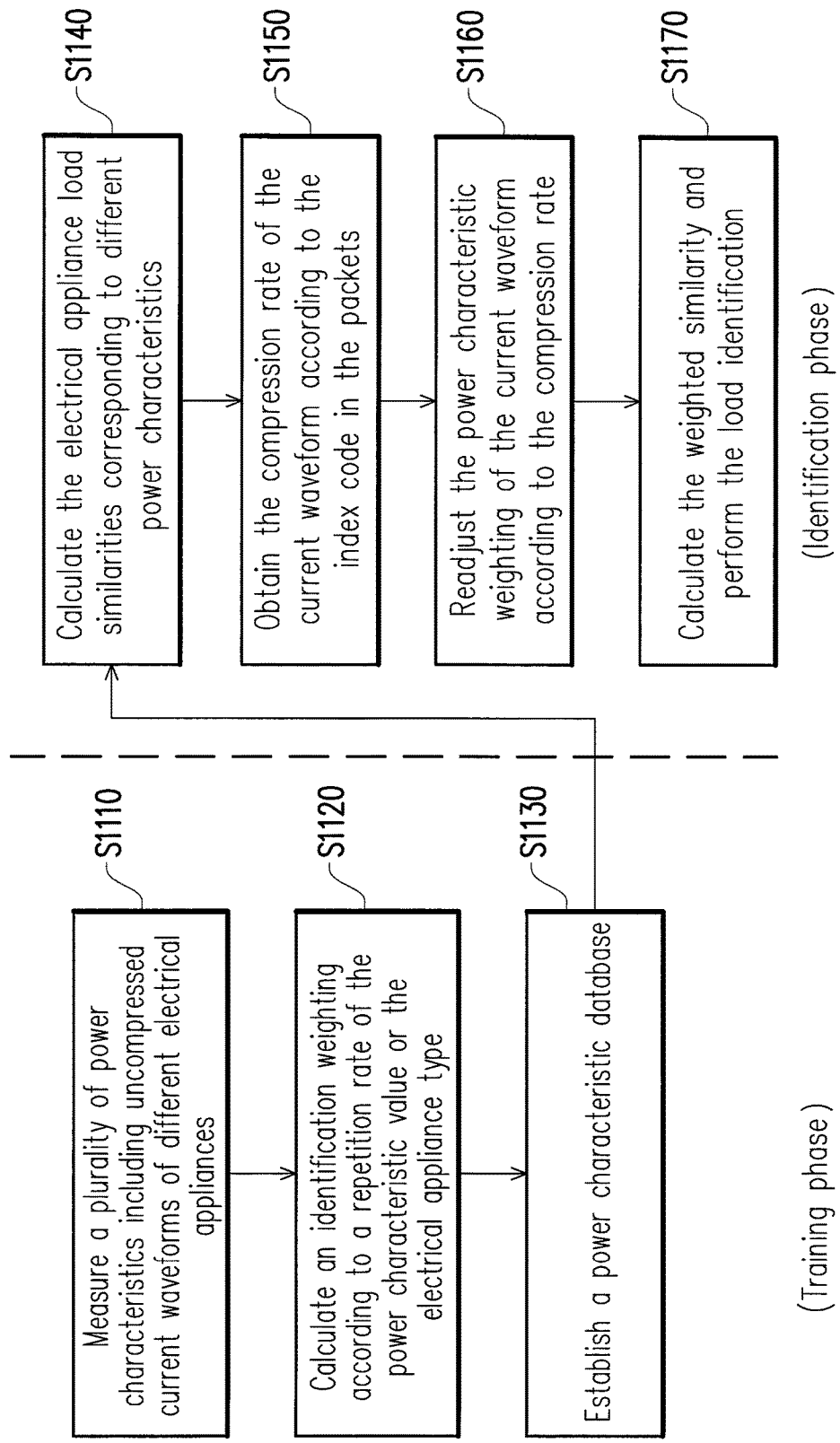
FIG. 11 is a flowchart illustrating a method of performing load identification by a remote server according to another embodiment of the disclosure.

Implementation of the step S370 is not limited to the related description of FIG. 3. For example, FIG. 11 is a flowchart illustrating a method of performing load identification by the remote server 110 according to another embodiment of the disclosure. In the embodiment of FIG. 11, the flow of the load identification is divided into a training phase and an identification phase. The training phase includes steps S1110-S1130. In the step S1110, a plurality of power characteristics including uncompressed current waveforms of different electrical appliance samples are first measured. In the step S1120, an identification weighting is calculated according to a repetition rate of the power characteristic value or the electrical appliance type. For example, the real power values of the electrical appliance sample A are tested/analyzed for multiple times (for example, 100 times) in advance, and according to the repetition rate of the real power value of the electrical appliance sample A in the 100 testing processes, the power characteristic weighting of the real power value of the electrical appliance sample A can be set in the step S1120. Finally, in the step S1130, a power characteristic database can be established according to results of the steps S1110 and S1120. The power characteristic database can be recorded in the electrical appliance power characteristic database 113 of the remote server 110.

The identification phase includes steps S1140-S1170. In the step S1140, the electrical appliance load similarities corresponding to different power characteristics are calculated (referring to related description of the step S374 of FIG. 3). In step S1150, the compression rate cp of the current waveform is obtained according to the index code in the packets uploaded by the smart meter 120, and in the step S1160, the power characteristic weighting of the current waveform is readjusted according to the compression rate cp (referring to related description of the step S372 of FIG. 3). After the power characteristic weighting of the current waveform is adjusted, in the step S1170, the weighted similarity is calculated and the load identification is performed (referring to related description of the step S376 of FIG. 3).

An assumption example is provided below to describe a management system of the smart meter. The assumption example may refer to the related descriptions of FIG. 1 to FIG. 10. Referring to FIG. 1, it is assumed that the operating cost of the service provided by the system operator is limited to 1000 dollars, and 3 users (a user A, a user B and a user C) use such service. The system operator allocates budget costs of 600, 300 and 100 dollars to the user A, the user B and the user C according to membership levels of the users. Taking the user A as an example, when the user A turns on an oven, the smart meter 120 of the user A detects occurrence of the loading event, and the smart meter 120 generates a set of power characteristic information of an unknown electrical appliance type. In the present embodiment, the power characteristic information includes a real power value (for example, 539 watts), a virtual power value (for example, 31 watts), a current waveform and a first order harmonic value (for example, 4).

Referring to FIG. 2 and FIG. 3, the processing unit 122 of the smart meter 120 can determine the type of the electrical appliance that triggers the loading event to be the resistance type in the step S330. Therefore, in the step S330, the processing unit 122 may use the pre-established compression rate-identification accuracy model $a=f_i(cp)$ of the resistance type electrical appliance. Under a design requirement that the identification accuracy is more than 90%, the threshold identification accuracy is set to 90%. According to the threshold identification accuracy 90%, the processing unit 122 can obtain a suitable compression rate of 0.45 from the compression rate-identification accuracy model $a=f_i(cp)$ of the resistance type electrical appliance in the step S330. Moreover, it is assumed that a sampling rate of the smart meter 120 is 3840 Hz, the sampling number of one periodic wave is 64.

According to the aforementioned information, the processing unit 122 of the smart meter 120 can find positions of the sampling points of the compressed waveform from a mapping table (for example, the lookup table of the table 1) of periodic wave sampling number-compression rate-sampling point positions. After the processing unit 122 executes the step S330 (data compression of the power characteristic), the processing unit 122 uploads the compressed data to the remote server 110 (for example, a cloud server). After the remote server 110 receives the compressed power characteristic packets of an unknown electrical appliance, the processing unit 112 of the remote server 110 performs decompression and restores the original waveform according to an interpolation method. After the decompression is performed, in the step S370, the processing unit 112 dynamically adjusts the power characteristic weighting to perform load identification. In the present assumption example, the data content of the electrical appliance samples in the electrical appliance power characteristic database 113 of the remote server 110 may include the real power value, the virtual power value, the current waveform data and the first order harmonic value. For example, a following table 9 lists content of the power characteristic database established according to a test/analysis result obtained after testing/analysing the oven.

TABLE 9 power characteristic database of oven

| Sample characteristic | Real power value | Virtual power value | Current waveform data | First order harmonic value |
|---|---|---|---|---|
| Content | 589 | 30 | Data stream DSo | 5 |
| Original power characteristic weighting | 0.9 | 0.8 | 0.8 | 0.75 |
| Adjusted power characteristic weighting | 0.9 | 0.8 | 0.44 | 0.75 |

In the step S372, the processing unit 112 can use the equation (1) to dynamically adjust the power characteristic weighting of the current waveform data. For example, it is assumed that the compression rate cp of the compressed data uploaded by the smart meter 120 is 0.45, according to the original power characteristic weighting $W_j$ (i.e. 0.8) of the current waveform data of the electrical appliance sample A in the table 9, the processing unit 112 can calculate the adjusted power characteristic weighting $W_i$=0.8*(1−0.45) =0.44.

Similarly, a following table 10 lists content of the power characteristic database established according to a test/analysis result obtained after testing/analysing a hair dryer.

TABLE 10 power characteristic database of hair dryer

| Sample characteristic | Real power value | Virtual power value | Current waveform data | First order harmonic value |
|---|---|---|---|---|
| Content | 400 | 28 | data stream DSd | 3 |
| Original power characteristic weighting | 0.88 | 0.81 | 0.9 | 0.8 |
| Adjusted power characteristic weighting | 0.88 | 0.81 | 0.495 | 0.8 |

It is assumed that the compression rate cp of the compressed data uploaded by the smart meter 120 is 0.45, according to the original power characteristic weighting $W_j$ (i.e. 0.9) of the current waveform data of the electrical appliance sample A in the table 9, the processing unit 112 can calculate the adjusted power characteristic weighting $W_i$=0.9*(1−0.45)=0.44.

In the step S374, the processing unit 112 calculates the equation (3) to obtain the similarity $SR_i$ between a power characteristic contained in the decompressed data of the step S360 and a sample characteristic of the electrical appliance sample. After the similarities $SR_i$ of different power characteristic types are obtained, in the step S374, the processing unit 112 uses the equation (4) to calculate weighted similarity between the power characteristic contained in the decompressed data of the step S360 and the corresponding electrical appliance sample according to the similarity $SR_i$ and the corresponding power characteristic weighting. For example, taking the oven of the table 9 and the hair dryer of the table 10 as an example, weighted similarities between the power characteristic contained in the decompressed data of the step S360 and the sample characteristics of the oven and the hair dryer are shown in a following table 11:

TABLE 11

| | weighted similarity | | | | |
|---|---|---|---|---|---|
| Power characteristic | Real power value | Virtual power value | Current waveform data | First order harmonic value | Weighted similarity |
| Smart meter | 539 | 31 | Data stream DSm | 4 | |
| Oven | 92% | 97% | 85% | 80% | 89% |
| Hair dryer | 65% | 89% | 88% | 67% | 75% |

In the step S370, the processing unit 112 can dynamically adjust the power characteristic weighting to perform the load identification, so as to compare the weighted similarities of different electrical appliance samples. As shown in the table 11, the weighted similarity SW of the oven is greater than the weighted similarity SW of the hair dryer, so that in the step S376, the processing unit 112 can determine that the unknown electrical appliance that triggers the loading event is the oven.

According to the above descriptions, the smart meter 120 generates the power characteristics, and dynamically adjusts the compression rate of the current waveform according to the budget costs and/or different compression rate-identification rate models to implement the optimised data compression, such that the accuracy of the electrical appliance load identification performed by the remote server 110 is the highest. After the compression is completed, the smart meter 120 uploads the compressed power characteristic to the remote server. The remote server 110 can dynamically adjust the power characteristic weighting to implement the load identification. The system operator provides services at the cloud, and cloud bandwidth calculations are all included in the cost calculation. When the compression rate is increased, the bandwidth demand is decreased, though the additional calculation cost is probably increased, and different electrical appliance types may have different influences on the accuracy of load identification under different compression rates. According to the aforementioned embodiments, under the limited budget cost, the accuracy of the electrical appliance load identification performed by the remote server 110 is the highest.

In order to process the huge amount of power data generated by a high accuracy electricity meter, the operating cost of the cloud platform of the system operator is increased. According to the aforementioned embodiments, the compression rate of the current waveform can be dynamically adjusted with reference of the load identification accuracy and different cloud platform charging mechanisms for different types of the electrical appliance power characteristics. When the remote server performs the load identification, different load identification weightings can be used according to different power characteristics of real power, virtual power, current waveforms, harmonics, transients, etc., so as to improve the identification accuracy.

Therefore, according to the aforementioned embodiment, non-invasive home appliance load monitoring can be implemented. By uploading different power characteristics through one (or a plurality of) electricity meter, the system may determine a load status (a turn on/off state) of an electrical appliance according to different power characteristics. According to the statistic/analysis result provided by the remote server, the user may learn a home electricity consumption status, and change an electricity consumption habit to decrease the energy consumption.

Figure 12:
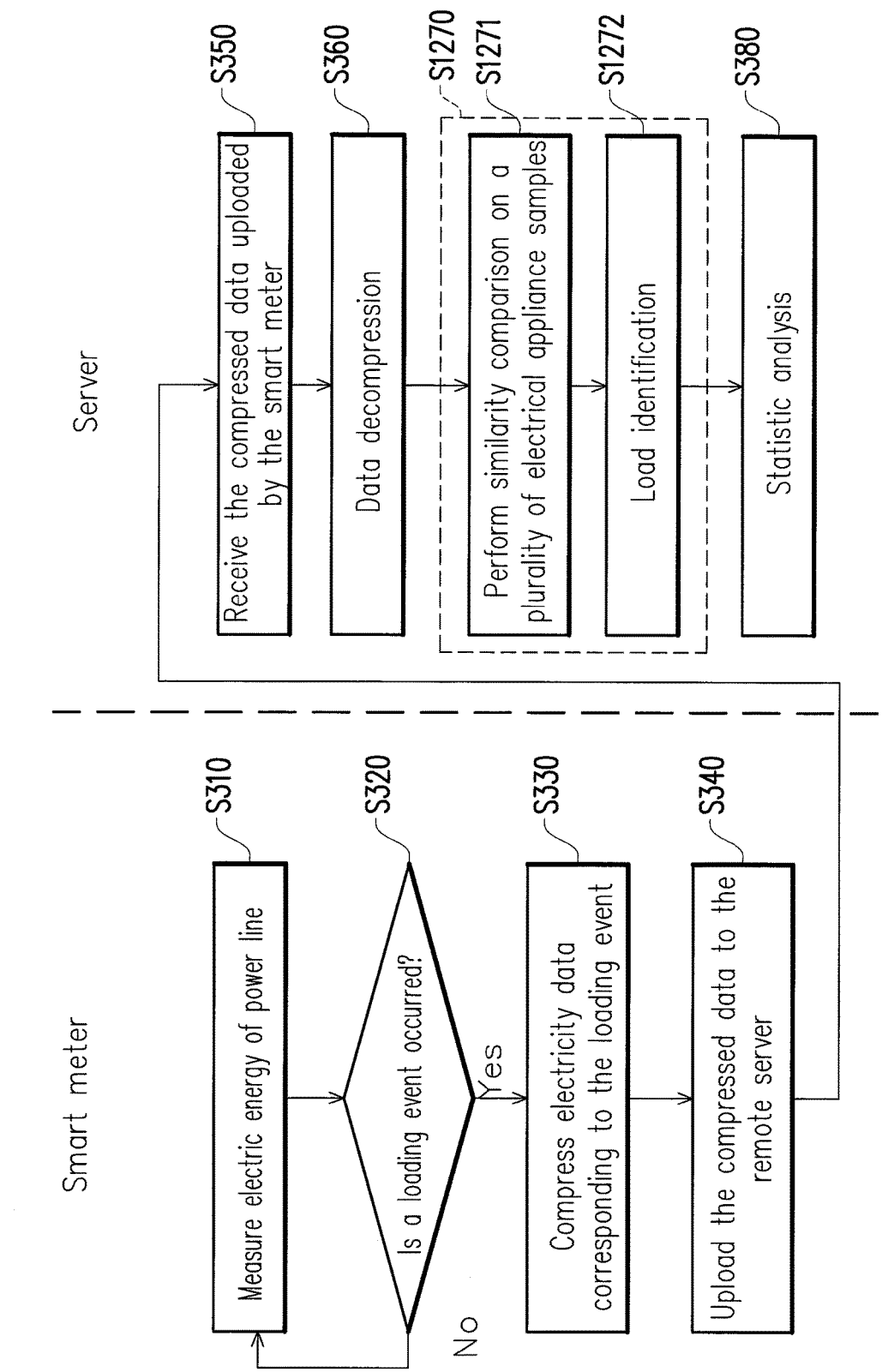
FIG. 12 is a flowchart illustrating operation methods of a smart meter and a remote server according to another embodiment of the disclosure.

However, the embodiments of the disclosure are not limited to the related descriptions of FIG. 3 to FIG. 11. For example, FIG. 12 is a flowchart illustrating operation methods of a smart meter and a remote server according to another embodiment of the disclosure. The embodiment of FIG. 12 can be deduced according to related descriptions of FIG. 1 to FIG. 11. A difference between the embodiment of FIG. 3 and the embodiment of FIG. 12 lies in a step S1270 of FIG. 12. Referring to FIG. 2 and FIG. 12, after the step S360 is completed, in the step S1270, the processing unit 112 performs the load identification on a plurality of electrical appliance samples in the electrical appliance power characteristic database 113 according to the power characteristics contained in the decompressed data of the step S360 (referring to related descriptions of the table 3, table 4, table 6 or table 7). In the present embodiment, the step S1270 includes steps S1271 and S1272.

The processing unit 112 executes the step S1271 to perform the load identification. Implementation details of the step S1271 can be deduced according to related descriptions of the step S374 of FIG. 3. A difference between the step S374 of FIG. 3 and the step S1271 of FIG. 12 is that in the step S1271 of FIG. 12, the power characteristic weighting $W_j$ recorded in the electrical appliance power characteristic database 113 is directly used as the power characteristic weighting $W_i$ required for calculating the weighted similarity SW.

After the step S1271 is completed, the processing unit 112 executes the step S1272 to determine the electrical appliance corresponding to the compressed data uploaded by the smart meter 120 according to the weighted similarity SW of the step S1271. Implementation details of the step S1272 can be deduced according to related description of the step S376 of FIG. 3, and details thereof are not repeated.

Figure 13:
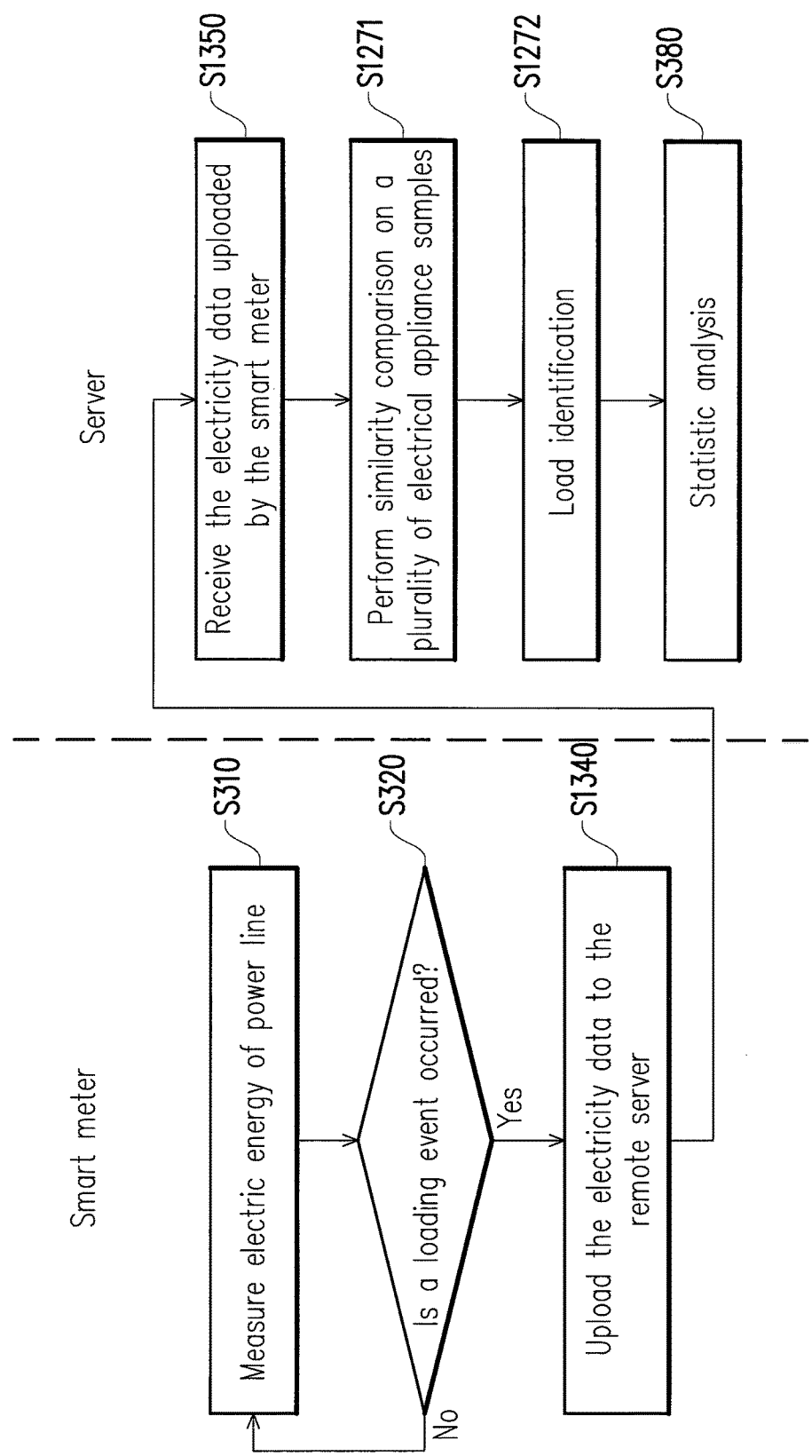
FIG. 13 is a flowchart illustrating operation methods of a smart meter and a remote server according to still another embodiment of the disclosure.

FIG. 13 is a flowchart illustrating operation methods of a smart meter and a remote server according to still another embodiment of the disclosure. The embodiment of FIG. 13 can be deduced according to related descriptions of FIG. 1 to FIG. 12. A difference between the embodiment of FIG. 12 and the embodiment of FIG. 13 lies in steps S1340 and S1350 of FIG. 13. Namely, in the embodiment of FIG. 13, the smart meter 120 does not perform the data compression, and directly uploads the uncompressed electricity data to the remote server 110.

Referring to FIG. 2 and FIG. 13, after the step S360 is completed, in the step S1340, the processing unit 122 of the smart meter 120 uploads the uncompressed electricity data to the remote server 110 through the communication unit 123. In the step S1350, the processing unit 112 of the remote server 110 receives the electricity data uploaded by the smart meter 120 through the communication unit 111, where the electricity data includes a plurality of power characteristics. Since the electricity data uploaded by the smart meter 120 is not compressed, in the step S1271, the processing unit 112 of the remote server 110 can directly perform the load identification on a plurality of electrical appliance samples in the electrical appliance power characteristic database 113 according to the power characteristic contained in the electricity data of the step S1350. Implementation detail of the step S1271 of FIG. 13 can be deduced according to related description of the step S1271 of FIG. 12, and details thereof are not repeated. After the step S1271 is completed, the processing unit 112 executes the step S1272 to determine the electrical appliance corresponding to the electricity data uploaded by the smart meter 120 according to the result of the load identification of the step S1271.

Figure 14:
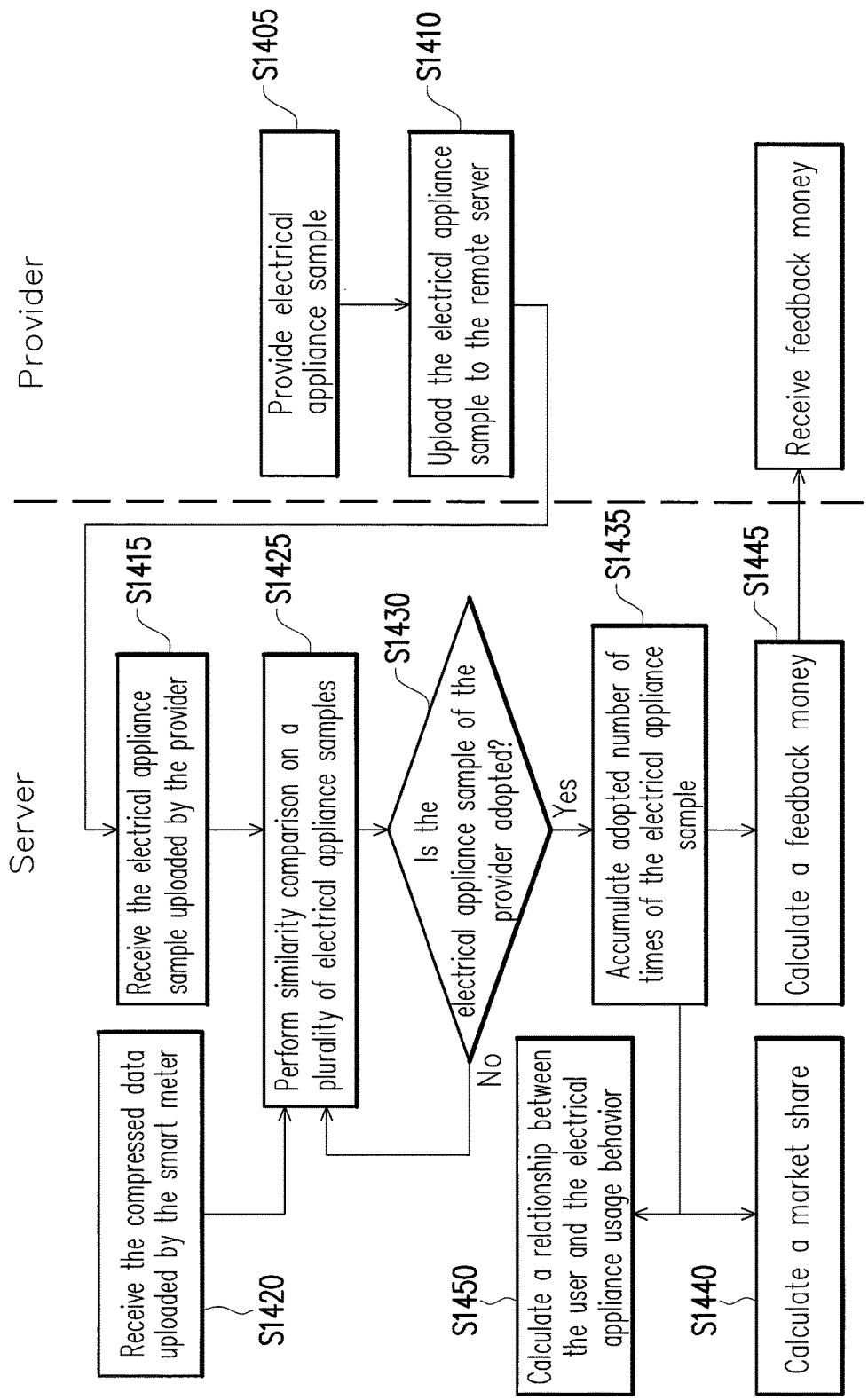
FIG. 14 is a flowchart illustrating a management method of an electrical appliance power characteristic database according to an embodiment of the disclosure.

FIG. 14 is a flowchart illustrating a management method of the electrical appliance power characteristic database according to an embodiment of the disclosure. A provider provides at least one electrical appliance sample (step S1405), and uploads the electrical appliance sample to the electrical appliance power characteristic database of the remote server (step S1410). The electrical appliance sample has a plurality of sample characteristics. For example, the power characteristics include a real power value, a virtual power value, a harmonic value, current waveform data or other characteristic data.

The provider can be an appliance manufacturer, a service provider, a general user or other provider willing to provide sample characteristics of a specific electrical appliance. The provider acquires electrical appliance power signal information (sample characteristic) through an acquisition system according to a flow. For example, the flow can be a following procedure: 1. confirming a connecting state of an electricity meter; 2. turning on the electrical appliance for measurement; 3. turning off the electrical appliance; 4. detecting a state of the electrical appliance; 5. completing the signal acquiring procedure. The signal acquiring flow can be a systematized standard operation procedure (SOP), and the SOP can be proposed through a signal acquisition knowledge base or system. The acquisition system may acquire sample characteristics through a single master meter, a socket-type meter, a combination of a plurality of electricity meters (for example, a combination of the master meter and the socket-type meter) or other electrical appliance signal acquisition equipment. When the sample characteristic of the electrical appliance sample is uploaded, the provider may fill in provider information (for example, a manufacturer name or a measurer account), environment information (for example, voltage of utility power, environment temperature or other environment conditions), information of measuring target (for example, electrical appliance information, usage mode of the electrical appliance, etc.) or other information.

The remote server receives the sample characteristic of the electrical appliance sample uploaded by the provider, and stores the sample characteristic of the electrical appliance sample to the electrical appliance power characteristic database (step S1415). After the remote server receives the measuring environment information and the sample characteristic of the electrical appliance sample uploaded by the provider, the remote server normalizes the electrical appliance sample to obtain the normalized electrical appliance sample, and upload the normalized electrical appliance sample to the electrical appliance power characteristic database. For example, the remote server performs power characteristic correction according to different measuring environments to produce a standard electrical appliance power characteristic database. The remote server uploads the normalized sample characteristic to the electrical appliance power characteristic database. When the sample characteristic of the electrical appliance sample is uploaded to the electrical appliance power characteristic database, the system automatically adds data of the electrical appliance sample for the user to download.

The user creates a user account on the remote server and provides the environment information (for example, a voltage environment). In some embodiments, the system may automatically confirm the environment information through an address of the user. The remote server receives a plurality of power characteristics uploaded by the smart meter (step S1420). For example, the smart meters 120, 130 and 140 upload the power characteristics to the remote server 110. When the user uses a certain electrical appliance, the smart meter of the user detects occurrence of the loading event, and automatically acquires an electrical appliance power signal characteristic (electricity data) to be analysed, and uploads the same to the remote server.

When the remote server receives the electricity data uploaded by the smart meter of the user, the remote server automatically performs the load identification on the content of the electrical appliance power characteristic database according to the power characteristic of the electricity data, and then records a result of the load identification in the user's account (step S1425). Implementation details of the step S1425 of FIG. 14 can be deduced according to the related descriptions of the steps S350 to S380 of FIG. 3, and details thereof are not repeated.

In some embodiments, the user can also set power signal characteristics (electricity data) of specific electrical appliances to be analysed through the system and compare a difference of the electrical appliance power characteristics (the comparing targets can be electrical appliances of the same or different model numbers), so as to analyze a usage state of the electrical appliance (for example, whether the electrical appliance is aged, abnormality, and difference in energy consumption, etc.). The power characteristic comparison sample of electrical appliance of the same model number can be a signal (the same electrical appliance) uploaded to the database in advance by the user in allusion to the same electrical appliance, or can be power signal characteristic of the electrical appliance of the same model number (i.e. different electrical appliances with the same model number) uploaded by the other providers (for example, the electrical appliance manufacturer or other users). The comparison samples of the electrical appliances of different model numbers can be air-conditioning appliances, for example, the user can compare a difference between an A-type air-conditioning appliance and a B-type air-conditioning appliance in a usage state (performance in power consumption, etc.). When a system used for analysing the electrical appliance is set, the user can fill in or select information of the measuring target (for example, electrical appliance information and usage mode of electrical appliance, etc.) or other information to confirm the electrical appliance sample to be compared. The acquisition system (for example, the smart meter 120) may acquire the electricity characteristics through a single master meter, a socket-type meter, a combination of a plurality of electricity meters (for example, a combination of the master meter and the socket-type meter) or other electrical appliance signal acquisition equipment. When the user uses the electrical appliance, the acquisition system detects occurrence of the loading event, and automatically acquires the electrical appliance power signal characteristic (the electricity data) to be analysed, and uploads the same to the remote server 110. When the remote server 110 receives the electricity data uploaded by the smart meter 120 of the user, the remote server 110 automatically performs the load identification on the content of the electrical appliance samples in the electrical appliance power characteristic database 113 according to the power characteristic of the electricity data, and provides user related information (for example, whether a power signal is abnormal, and an energy consumption difference of the electrical appliances of the same or different model numbers) to the user according to compared analysis information.

When the result of the load identification indicates that the electrical appliance sample uploaded by the user is adopted (step S1430), the remote server automatically accumulates adopted number of times of the electrical appliance sample (step S1435) to serve as a reference in post information analysis and cash flow profit sharing, etc. For example, according to the adopted number of times of the electrical appliance sample, the remote server can calculate a market share of the electrical appliance corresponding to the electrical appliance sample, and an electricity consumption habit of the electrical appliance, etc. (step S1440), and the provide the information to the related demanders (for example, marketing practitioners, home appliance practitioners, energy practitioners, government authorities, or others). For another example, according to the adopted number of times of the electrical appliance sample, the remote server can calculate a corresponding feedback mechanism to the provider, for example, calculate an amount of money fed back to the provider (step S1445). For still another example, according to user account information and information indicating that the electrical appliance sample is adopted, in the step S1450, the remote server can calculate a relationship between the user and an electrical appliance usage behavior (for example, different electrical appliance types concerned by users of different attributes, electrical appliance combination used by different users, etc.), and provides the information to the related demanders (for example, marketing practitioners, home appliance practitioners, energy practitioners, or others).

In summary, the present embodiment provides a management method of an electrical appliance power characteristic database to establish a mechanism that the providers (for example, home appliance manufacturers, service providers, general users or others) provide the electrical appliance samples to the system.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A management system of smart meter, comprising:
a remote server; and
at least one smart meter, coupled to the remote server through a communication network, wherein the smart meter measures electrical energy of at least one power line to obtain at least one batch of electricity data, the smart meter detects whether a loading event occurs, wherein, when the loading event occurs, the smart meter provides a plurality of compression rate-identification accuracy models corresponding to different electrical appliance types, analyzes the electricity data obtained during an event period corresponding to the loading event to determine an electrical appliance type corresponding to the loading event, selects a corresponding model a=fi(cp) from the compression rate-identification accuracy models according to the electrical appliance type, wherein a is an identification accuracy, and cp is a compression rate, dynamically determines the compression rate cp from the corresponding model according to a threshold identification accuracy corresponding to the remote server performs a data compression on the electricity data obtained during the event period according to the determined compression rate cp to obtain compressed data, and uploads the compressed data to the remote server, wherein the remote server performs data decompression on the compressed data to obtain decompressed data, and the remote server performs load identification according to the decompressed data, wherein the smart meter resolves a following optimization problem to dynamically determine compression rate cp:

Adjust cp, max fi(cp)
In subject to
Rb+Rs+Rc≤b
where
Rb=gb(D, cp, Ub)
Rs=gs(D, cp, Us)
Rc=gc(D, cp, Uc)

where D is an amount of data uploaded to the remote server, Ub is a bandwidth unit price, Rb is bandwidth cost, Us is a storage unit price, Rs is storage cost, Uc is a calculation unit price, Rc is calculation cost, and b is a cost amount, and the identification accuracy a is maximized by determining the compression rate cp under a limited cost amount b.

2. The management system of smart meter as claimed in claim 1, wherein the electricity data comprises at least a real power value or current waveform data.

3. The management system of smart meter as claimed in claim 1, wherein the electricity data comprises a real power value and a virtual power value, the smart meter determines whether a ratio between the real power value and the virtual power value is greater than a threshold value, and the smart meter determines the electrical appliance type as a resistance type when the ratio between the real power value and the virtual power value is greater than the threshold value.

4. The management system of smart meter as claimed in claim 1, wherein the electricity data comprises voltage-current curve data, and the smart meter determines the electrical appliance type according to an enclosed area of a voltage-current curve corresponding to the voltage-current curve data.

5. The management system of smart meter as claimed in claim 4, wherein the smart meter determines whether the enclosed area is smaller than a threshold value, and the smart meter determines the electrical appliance type as a resistance type when the enclosed area is smaller than the threshold value.

6. The management system of smart meter as claimed in claim 4, wherein the voltage-current curve comprises a left segment, a middle segment and a right segment, the smart meter determines whether a ratio between the enclosed area of the left segment and the right segment and the enclosed area of the middle segment is greater than a threshold value, and the smart meter determines the electrical appliance type as an electronic type when the ratio is greater than the threshold value, and the smart meter determines the electrical appliance type as an inductance type when the ratio is smaller than the threshold value.

7. The management system of smart meter as claimed in claim 1, wherein the electricity data comprises a harmonic ratio, the smart meter determines whether the harmonic ratio is greater than a threshold value, and the smart meter determines the electrical appliance type as an inductance type when the harmonic ratio is greater than the threshold value, and the smart meter determines the electrical appliance type as a fluorescent lamp type when the harmonic ratio is smaller than the threshold value.

8. The management system of smart meter as claimed in claim 7, wherein the harmonic ratio is a ratio between a third harmonic and a second harmonic.

9. The management system of smart meter as claimed in claim 1, wherein the electricity data comprises current waveform data, and the smart meter finds sampling point position information from a lookup table according to the electrical appliance type and the compression rate, and the smart meter abandons a part of content of the current waveform data according to the sampling point position information, so as to obtain the compressed data.

10. The management system of smart meter as claimed in claim 1, wherein the remote server obtains an index code from a packet containing the compressed data, the remote server finds sampling point position information from a lookup table according to the index code, and the remote server performs the data decompression on the compressed data by using an interpolation method according to the sampling point position information, so as to obtain the decompressed data.

11. The management system of smart meter as claimed in claim 1, wherein the decompressed data comprises a plurality of power characteristics, the remote server performs a similarity comparison on a plurality of electrical appliance samples in an electrical appliance power characteristic database according to the power characteristics, and the remote server determines an electrical appliance corresponding to the loading event according to a result of the similarity comparison.

12. The management system of smart meter as claimed in claim 11, wherein the power characteristics comprise at least a real power value or current waveform data.

13. The management system of smart meter as claimed in claim 11, wherein one sample in the electrical appliance samples has a plurality of sample characteristics, the remote server respectively calculates a similarity between each of the power characteristics and a corresponding sample characteristic in the sample characteristics, the remote server calculates a weighted similarity of the power characteristics and the sample according to the similarities, and the remote server determines an electrical appliance corresponding to the loading event according to the weighted similarity of the electrical appliance samples.

14. The management system of smart meter as claimed in claim 13, wherein the sample further has a plurality of power characteristic weightings corresponding to the sample characteristics, and the remote server calculates the weighted similarity of the power characteristics and the sample according to the similarities and the power characteristic weightings.

15. The management system of smart meter as claimed in claim 14, wherein the power characteristic weightings relate to a repetition rate of the sample characteristics.

16. The management system of smart meter as claimed in claim 14, wherein the remote server dynamically adjusts at least one of the power characteristic weightings according to the compression rate cp of the data compression.

17. The management system of smart meter as claimed in claim 1, wherein the remote server further counts a result of the load identification to obtain accumulated electricity consumption of different electrical appliances.

18. An operation method of smart meter, comprising:
measuring electrical energy of at least one power line to obtain at least one batch of electricity data;
detecting whether a loading event occurs;
performing data compression on the electricity data obtained during an event period corresponding to the loading event to obtain compressed data when the loading event occurs; and
uploading the compressed data to a remote server,
wherein the step of performing data compression on the electricity data obtained during an event period comprises:
analyzing the electricity data obtained during the event period to determine an electrical appliance type corresponding to the loading event;
dynamically determining a compression rate of the data compression according to the electrical appliance type; and
performing the data compression on the electricity data obtained during the event period according to the compression rate, so as to obtain the compressed data,
wherein the step of determining the compression rate of the data compression comprises:
providing a plurality of compression rate-identification accuracy models corresponding to different electrical appliance types;
selecting a corresponding model a=fi(cp) from the compression rate-identification accuracy models according to the electrical appliance type, wherein a is an identification accuracy, and cp, is the compression rate;
dynamically determines the compression rate from the corresponding model according to a threshold identification accuracy corresponding to the remote server; and
resolving a following problem to dynamically determine compression rate cp:
Adjust cp, max fi(cp)
In subject to
Rb+Rs+Rc≤b
where
Rb=gb(D, cp, Ub)
Rs=gs(D, cp, Us)
Rc=gc(D, cp, Uc)
where D is an amount of data uploaded to the remote server, Ub is a bandwidth unit price, Rb is bandwidth cost, Us is a storage unit price, Rs is storage cost, Uc is a calculation unit price Rc is calculation cost and b is a cost amount, and the identification accuracy a is maximized by determining the compression rate cp under a limited cost amount b.

19. The operation method of smart meter as claimed in claim 18, wherein the electricity data comprises at least a real power value or current waveform data.

20. The operation method of smart meter as claimed in claim 18, wherein the electricity data comprises a real power value and a virtual power value, and the step of analyzing the electricity data obtained during the event period comprises:
determining whether a ratio between the real power value and the virtual power value is greater than a threshold value; and
determining the electrical appliance type as a resistance type when the ratio between the real power value and the virtual power value is greater than the threshold value.

21. The operation method of smart meter as claimed in claim 18, wherein the electricity data comprises voltage-current curve data, and the step of analyzing the electricity data obtained during the event period comprises:
determining the electrical appliance type according to an enclosed area of a voltage-current curve corresponding to the voltage-current curve data.

22. The operation method of smart meter as claimed in claim 21, wherein the step of determining the electrical appliance type comprises:
determining whether the enclosed area is smaller than a threshold value; and
determining the electrical appliance type as a resistance type when the enclosed area is smaller than the threshold value.

23. The operation method of smart meter as claimed in claim 21, wherein the voltage-current curve comprises a left segment, a middle segment and a right segment, and the step of determining the electrical appliance type comprises:
determining whether a ratio between the enclosed area of the left segment and the right segment and the enclosed area of the middle segment is greater than a threshold value;
determining the electrical appliance type as an electronic type when the ratio is greater than the threshold value; and
determining the electrical appliance type as an inductance type when the ratio is smaller than the threshold value.

24. The operation method of smart meter as claimed in claim 18, wherein the electricity data comprises a harmonic ratio, and the step of analyzing the electricity data obtained during the event period comprises:
determining whether the harmonic ratio is greater than a threshold value;
determining the electrical appliance type as an inductance type when the harmonic ratio is greater than the threshold value; and
determining the electrical appliance type as a fluorescent lamp type when the harmonic ratio is smaller than the threshold value.

25. The operation method of smart meter as claimed in claim 24, wherein the harmonic ratio is a ratio between a third harmonic and a second harmonic.

26. The operation method of smart meter as claimed in claim 18, wherein the electricity data comprises current waveform data, and the step of performing the data compression comprises:
finding sampling point position information from a lookup table according to the electrical appliance type and the compression rate; and
abandoning a part of content of the current waveform data according to the sampling point position information, so as to obtain the compressed data.

27. A smart meter, comprising:
a power measuring unit, measuring electrical energy of at least one power line to obtain at least one batch of electricity data;
a communication unit; and
a processing unit, coupled to the power measuring unit and the communication unit, and detecting whether a loading event occurs, wherein, when the loading event occurs, the processing unit provides a plurality of compression rate-identification accuracy models corresponding to different electrical appliance types, analyzes the electricity data obtained during the event period to determine an electrical appliance type corresponding to the loading event, selects a corresponding model a=fi(cp) from the compression rate-identification accuracy models according to the electrical appliance type, wherein a is an identification accuracy, and cp is a compression rate, dynamically determines the compression rate cp from the corresponding model according to a threshold identification accuracy, performs a data compression on the electricity data obtained during the event period to obtain compressed data according to the determined compression rate cp, and the processing unit uploads the compressed data to a remote server through the communication unit, wherein the processing unit resolves a following optimization problem to dynamically determine compression rate cp by using an optimization algorithm:

Adjust cp, max fi(cp)

In subject to

Rb+Rs+Rc≤b where

Rb=gb(D, cp, Ub)

Rs=gs(D, cp, Us)

Rc=gc(D, cp, Uc)

where D is an amount of data uploaded to the remote server, Ub is a bandwidth unit price, Rb is bandwidth cost, Us is a storage unit price, Rs is storage cost, Uc is a calculation unit price, Rc is calculation cost, and b is a cost amount, and the identification accuracy a is maximized by determining the compression rate cp under a limited cost amount b.

28. The smart meter as claimed in claim 27, wherein the electricity data comprises at least a real power value or current waveform data.

29. The smart meter as claimed in claim 27, wherein the electricity data comprises a real power value and a virtual power value, the processing unit determines whether a ratio between the real power value and the virtual power value is greater than a threshold value, and the processing unit determines the electrical appliance type as a resistance type when the ratio between the real power value and the virtual power value is greater than the threshold value.

30. The smart meter as claimed in claim 27, wherein the electricity data comprises voltage-current curve data, and the processing unit determines the electrical appliance type according to an enclosed area of a voltage-current curve corresponding to the voltage-current curve data.

31. The smart meter as claimed in claim 30, wherein the processing unit determines whether the enclosed area is smaller than a threshold value, and the processing unit determines the electrical appliance type as a resistance type when the enclosed area is smaller than the threshold value.

32. The smart meter as claimed in claim 30, wherein the voltage-current curve comprises a left segment, a middle segment and a right segment, the processing unit determines whether a ratio between the enclosed area of the left segment and the right segment and the enclosed area of the middle segment is greater 14 than a threshold value, and the processing unit determines the electrical appliance type as an electronic type when the ratio is greater than the threshold value, and the processing unit determines the electrical appliance type as an inductance type when the ratio is smaller than the threshold value.

33. The smart meter as claimed in claim 27, wherein the electricity data comprises a harmonic ratio, the processing unit determines whether the harmonic ratio is greater than a threshold value, and the processing unit determines the electrical appliance type as an inductance type when the harmonic ratio is greater than the threshold value, and the processing unit determines the electrical appliance type as a fluorescent lamp type when the harmonic ratio is smaller than the threshold value.

34. The smart meter as claimed in claim 33, wherein the harmonic ratio is a ratio between a third harmonic and a second harmonic.

35. The smart meter as claimed in claim 27, wherein the electricity data comprises current waveform data, and the processing unit finds sampling as point position information from a lookup table according to the electrical appliance type and the compression rate, and the processing unit abandons a part of content of the current waveform data according to the sampling point position information, so as to obtain the compressed data.

* * * * *